United States Patent
Ramachandra et al.

(10) Patent No.: US 11,044,641 B2
(45) Date of Patent: Jun. 22, 2021

(54) HANDOVER PROCEDURES IN MULTI-CARRIER NETWORKS

(71) Applicant: Telefonaktiebolaget LM Ericsson (publ), Stockholm (SE)

(72) Inventors: Pradeepa Ramachandra, Linköping (SE); Joel Berglund, Linköping (SE); Mirsad Cirkic, Linköping (SE); Henrik Rydén, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 610 days.

(21) Appl. No.: 15/502,436

(22) PCT Filed: Dec. 20, 2016

(86) PCT No.: PCT/EP2016/081914
§ 371 (c)(1),
(2) Date: Feb. 7, 2017

(87) PCT Pub. No.: WO2018/113921
PCT Pub. Date: Jun. 28, 2018

(65) Prior Publication Data
US 2018/0220340 A1    Aug. 2, 2018

(51) Int. Cl.
*H04W 36/00* (2009.01)
*H04W 36/08* (2009.01)
(Continued)

(52) U.S. Cl.
CPC ... *H04W 36/0027* (2013.01); *H04W 36/0044* (2013.01); *H04W 36/0061* (2013.01);
(Continued)

(58) Field of Classification Search
CPC . H04L 5/0091–0098; H04L 5/02; H04L 5/08; H04L 5/14–18; H04L 5/26;
(Continued)

(56) References Cited

U.S. PATENT DOCUMENTS

| | | | |
|---|---|---|---|
| 2011/0149913 A1* | 6/2011 | Park | H04W 36/0085 370/332 |
| 2014/0146788 A1* | 5/2014 | Wallentin | H04W 36/32 370/331 |
| 2017/0070934 A1* | 3/2017 | Luo | H04W 36/18 370/331 |

FOREIGN PATENT DOCUMENTS

| | | |
|---|---|---|
| WO | 2015150374 A1 | 10/2015 |
| WO | 2016003336 A1 | 1/2016 |
| WO | 2016045695 A1 | 3/2016 |
| WO | 2017039504 A1 | 3/2017 |

OTHER PUBLICATIONS

Ericsson; "Inter-cell handover in NR"; 3GPP TSG-RAN WG2 Meeting #96; Reno, Nevada, USA; Nov. 14-18, 2016; pp. 1-7; R2-168730.
(Continued)

*Primary Examiner* — Timothy J Weidner
(74) *Attorney, Agent, or Firm* — Patent Portfolio Builders, PLLC

(57) ABSTRACT

To perform handover in a multi-carrier network, a node that is currently serving a user equipment, UE, informs the neighboring nodes about the UE position and UE capabilities in terms of supported carriers. The neighboring nodes reply with a figure of merit indicative of connection efficacy, or data from which connection efficacy can be estimated, such as predicted signal quality and strength for each specified carrier. The serving node then determines, based on these predicted values, how to restrict mobility reference signal, MRS, measurements to promising candidate combinations of neighboring nodes and their carriers. Turning on of reference signals is thus limited, excluding nodes and carriers that will not be able to accept handover on technical or policy grounds, as well as nodes or carriers which have poor predicted signal quality.

25 Claims, 13 Drawing Sheets

(51) Int. Cl.
  *H04W 36/20* (2009.01)
  *H04W 36/22* (2009.01)
  *H04W 36/28* (2009.01)
  *H04W 36/30* (2009.01)
  *H04W 36/32* (2009.01)
  *H04W 88/02* (2009.01)
  *H04W 88/08* (2009.01)
  *H04W 92/10* (2009.01)
  *H04W 92/20* (2009.01)

(52) U.S. Cl.
  CPC ... *H04W 36/0072* (2013.01); *H04W 36/0088* (2013.01); *H04W 36/0094* (2013.01); *H04W 36/08* (2013.01); *H04W 36/20* (2013.01); *H04W 36/22* (2013.01); *H04W 36/28* (2013.01); *H04W 36/30* (2013.01); *H04W 36/32* (2013.01); *H04W 88/02* (2013.01); *H04W 88/08* (2013.01); *H04W 92/10* (2013.01); *H04W 92/20* (2013.01)

(58) Field of Classification Search
  CPC ..... H04W 8/005–30; H04W 24/02–10; H04W 36/0005–385; H04W 40/005–38; H04W 72/005–14; H04W 76/10–25; H04W 88/005–12; H04W 92/10–22
  See application file for complete search history.

(56) References Cited

OTHER PUBLICATIONS

Qualcomm Inc.; "DL mobility in above 6 GHz bands"; 3GPP TSG-RAN WG1 #87; Reno, Nevada, USA; Nov. 14-18, 2016; pp. 1-3; R1-1612044.

Matthias Klaus Thomas Siebert. "Interworking of Wireless and Mobile Networks based on Location Information"; Dissertation; Retrieved from the internet: URL:http://http://www.comnets.rwth-aachen.de/publications/complete-lists/abstracts/singlepage/p/954.html?tx_cndownload_pi1%5Bsubtype%5D=abstract [retrieved on Oct. 20, 2016] Dec. 18, 2006; pp. 1-356.

Giordani. "Multi-Connectivity in 5G mm Wave Cellular Networks"; Accepted at the 15th Annual Mediterranean Ad Hoc Networking Worshop (MED-HOC-NET); arXiv:1605.00105v1; Barcelona, Spain; Apr. 30, 2016; pp. 1-7.

MmMAGIC. "Initial concepts on 5G architecture and integration"; Project Name: Millimetre-Wave Based Mobile Radio Access Network for Fifth Generation Integrated Communication (mmMAGIC); Mar. 31, 2016; pp. 1-114; Version 1; Document No. H2020 ICT 67 1650 mmMAGIC/D3.1.

Kim et al. "A Multiple Bean Management Scheme on 5G Mobile Communication Systems for Supporting High Mobility"; 2016 International Conference on Information Networking (ICOIN); IEEE; 2016; pp. 260-264; doi:10.1109/ICOIN.2016.7427073.

* cited by examiner

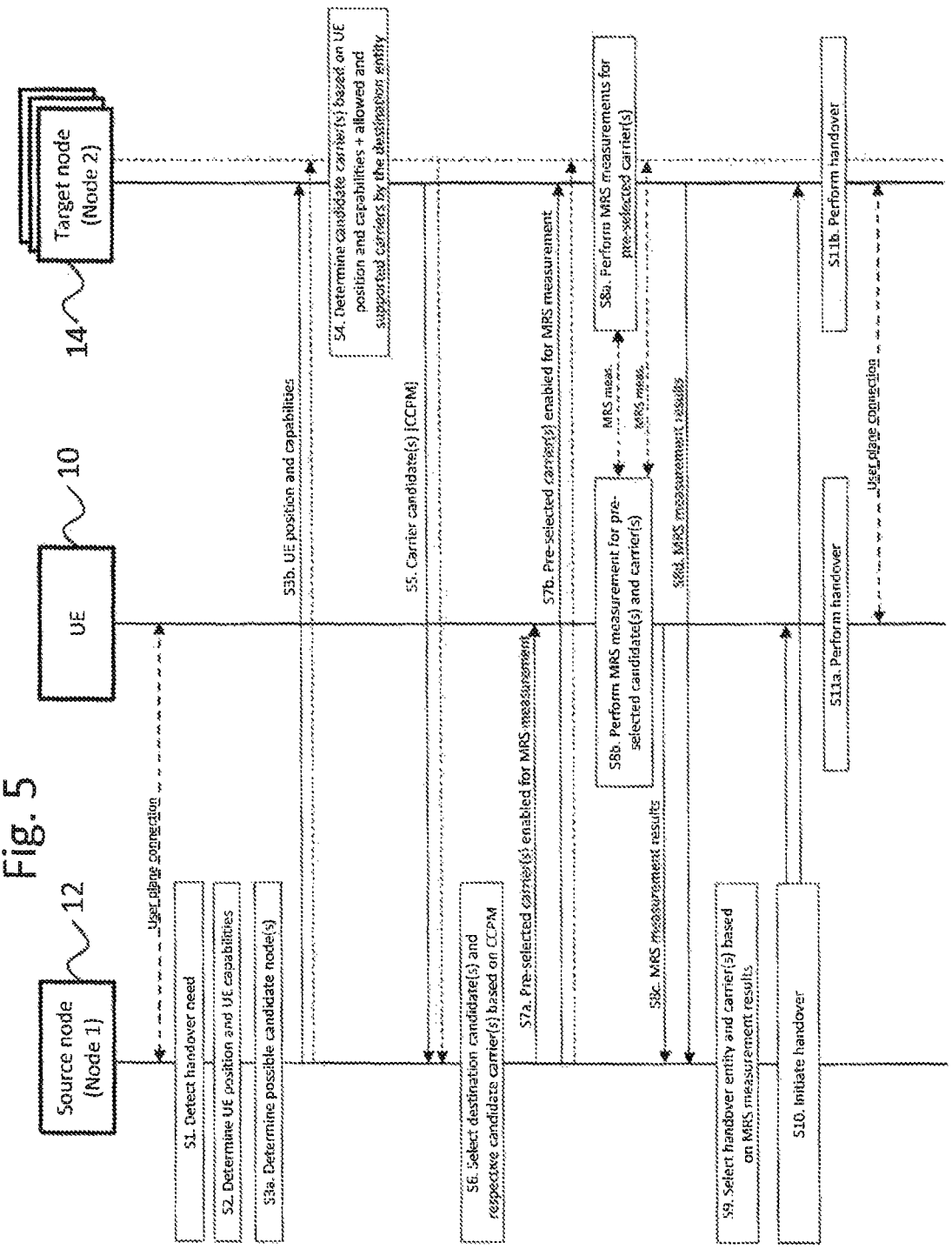

Fig. 6

```
-- ASN1START

UE-information ::= {
        UEid                    (integer)
        geoPosition             LocationInfo-r10    Optional
        radioPosition           Radio-position      Optional
        ueCapabilities          UE-capabilites      Optional
}

LocationInfo-r10 ::=        {
        locationCoordinates-r10                 CHOICE {
                ellipsoid-Point-r10                     OCTET STRING,
                ellipsoidPointWithAltitude-r10          OCTET STRING,
                ...,
                ellipsoidPointWithUncertaintyCircle-r11         OCTET STRING,
                ellipsoidPointWithUncertaintyEllipse-r11        OCTET STRING,
                ellipsoidPointWithAltitudeAndUncertaintyEllipsoid-r11   OCTET
STRING,
                ellipsoidArc-r11                                OCTET STRING,
                polygon-r11                                     OCTET STRING
        },
        horizontalVelocity-r10                  OCTET STRING OPTIONAL,
        gnss-TOD-msec-r10                       OCTET STRING OPTIONAL,
        ...
}

Radio-Position ::= sequence {
nodeID              (integer)
carrierID           (integer) ,    OPTIONAL
time_estimate       (integer) ,    OPTIONAL
precoder            (integer) ,    OPTIONAL
signalStrength      (integer) ,    OPTIONAL
...
}

UEcapabilites ::{
supportedCarriers sequence(integers)    , OPTIONAL
UEnoisePower (integer)                  , OPTIONAL
...
}

-- ASN1STOP
```

Fig. 7

```
-- ASN1START

CoveragePrediction ::= {
UEId              (integer)
carrierInfo       carrier-info
} carrier-info ::sequence {
carrierID              (integer)
carrierProbability     (integer)
carrierAllowed         (boolean)            , OPTIONAL
...
}

-- ASN1STOP
```

HANDOVER PROCEDURES IN MULTI-CARRIER NETWORKS

TECHNICAL FIELD

The present disclosure relates to handover procedures in multi-carrier networks.

BACKGROUND

MIMO (Multiple Input Multiple Output) is a multi-antenna technique that uses multiple antennas at the transmitter and receiver to perform spatial multiplexing. Multi-antenna techniques can significantly increase the data rates and reliability of a wireless communication system. The performance is In particular improved if both the transmitter and the receiver are equipped with multiple antennas, which results in a MIMO communication channel.

The LTE (Long Term Evolution) standard is already currently evolving with enhanced MIMO support. Currently LTE-Advanced supports an 8-layer spatial multiplexing mode for 8 transmission antennas with channel-dependent precoding. Beyond LTE, for next generation systems there is work on MIMO with very large numbers of antenna elements per antenna, for example 100 or more. This is called "massive MIMO".

The term "massive beamforming" is used to refer to the beamforming requirements for antennas used in massive MIMO systems, in particular at the higher frequencies being contemplated for next generation systems. In next generation, so-called 5G or NR (New Radio) systems, it is being considered to use higher carrier frequencies (e.g. 15 GHz) alongside current carrier frequencies (e.g. 2.6 GHz). That is combined provision and use of the 2.6 GHz and 15 GHz layers is contemplated. (The conventional, lower frequency carriers are often referred to as microwave band, and the new, higher frequency bands as millimeter band, although this labelling is not technically rigorous, since these bands overlap and the millimeter band starts at 30 GHz.) As carrier frequency increases, antenna elements become smaller ceteris paribus. With this, it becomes possible to accommodate more antenna elements into less space. For example, a state-of-the-art antenna for 2.6 GHz is roughly one meter tall, and contains 20 elements. At 15 GHz, it is possible to design an antenna with 200 elements that is only 5 cm wide and 20 cm tall.

With more antenna elements, it becomes possible to use beamforming at the antenna to steer the transmission towards the intended receiver. By steering the transmission, coverage can be significantly improved. Further development of advanced antenna systems (AAS) for massive MIMO is therefore a significant area.

However, it is not energetically desirable to support transmission In all directions (i.e. "broadcasting") all the time (i.e. "always on"). Rather the antennas need to be intelligently controlled, so that only transmission directions that are currently involved in data transmission are energized. This is especially so at higher frequencies where losses are higher, in particular free-space propagation losses, diffraction losses and wall-penetration losses. Consequently, energy requirements become more and more significant with increasing frequency. The move towards antenna energy management in these high frequency systems is called "lean design" or "ultra-lean design".

Directionally transmitting a signal to aim it at a specific receiver is called user-specific beamforming. The transmission can be steered In both the vertical and horizontal dimensions to each individual UE. Since one cell may serve hundreds of UEs at any one time, the beam direction may need to change several times per millisecond. It will also be necessary to use multi-user MIMO (MU-MIMO), which is MIMO in which two or more UEs in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased.

5G systems of this kind, e.g. those operating with multiple carriers, some at high frequency, which use MU-MIMO with beamforming and ultra-lean design are sometimes referred to as next generation radio (NR) systems. An NR system is thus an ultra-lean, beam-formed, multi-carrier communication system. The NR systems are expected to work In a wide range of frequencies ranging from a few MHz up to 100 GHz. This means that the NR systems will have many carriers and that the UEs will be required to support multiple ones of these carriers.

A recent summary of the development status of 5G systems including a discussion on NR systems can be found in:

"Initial concepts on 5G architecture and Integration" 31 Mar. 2016
Document H2020-ICT-671650-mmMAGIC/D3.1

In NR deployments with large antenna arrays and many possible candidate beam configurations, all beams cannot transmit reference signals in an always-on, static manner. Instead, the signals to be measured in connection with handover are measured only selectively using 'Mobility Beams'. Namely, the transmission is divided into 'Link Beams', which transmit the control plane data and the user plane data, and 'Mobility Beams' which transmit the 'Mobility Reference Signal' (MRS) for checking handover requirements. The 'Mobility Beams' are beam-formed and have wider coverage than the 'Link Beams'. The serving node can select which 'Mobility Beams' to use based on perceived relevance to current conditions. A UE is instructed to measure on a set of MRSs and report back to the serving node on the received signal strength and quality of the MRSs it measures. Based on some criteria, for example difference between MRS strength between two mobility beams, a handover can be triggered. For mobility to work efficiently, the nodes may need to maintain neighbor lists, exchange beam information, and coordinate MRS usage.

Based on the measurement report of MRSs obtained from the UE, the serving node decides on the target node for the UE in a handover (HO) procedure based on as downlink (DL) measurement, wherein DL measurement in this context means that the MRS(s) are transmitted by the node(s) and received and measured by the UEs. HO procedures based on UL measurement are also possible, i.e. transmission of reference signal by UEs which is received and measured by the nodes.

(This contrasts with the corresponding situation in LTE where always-on signals are measured by the UE-CRS (Cell-specific Reference Signal) in LTE—and are reported to the serving, source node either periodically or upon the occurrence of an event based on those measurements.)

FIG. 1 is a schematic diagram of an example system environment having several transmitter network entities with partially overlapping coverage and an example moving UE (user equipment).

Transmitting network entities T1, T2, T3 for secondary cells (SCells) operating in millimeter or microwave frequencies are shown with respective coverages C1, C2, C3. The coverage of each SCell Is characterised by directional beam output, with elliptical beams having 8-fold symmetry in increments of 45 degrees being shown by way of example. The example is also illustrated in 2D rather than 3D for simplicity of representation. The system environment also includes a master cell (MCell) T4 with coverage C4 operating at higher frequency according to 3GPP LTE which is an always-on network entity with no strong directionality. A UE is illustrated moving in the system environment (from left-to-right in the drawing as indicated schematically by the arrow) and having coverage from each of T1, T2, T3 and T4. T1 is currently the serving node, but it can be seen that the UE movement direction means that handover will be needed shortly. Moreover, from the coverages, it would seem likely that T2 is probably the most promising SCell candidate node for handover, although coverage from the MCell T4 would also be possible.

FIG. 2 shows the basic steps of a generic DL-measurement-based handover procedure as envisaged for NR.

Initially, Node 1 is serving a UE with a suitable user plane connection. That is, Node 1 is the serving, source node. The handover procedure then proceeds as follows:

S1.1: A measurement result indicates a need for handover for the UE. The trigger may be deterioration in signal quality, or presence of a stronger signal from another node.

S1.2: Candidate, target nodes for handover are identified and the MRS measurements they need to generate MRS signals for are specified. In this example, Node 2 is included as an example candidate node, but it will be understood other candidate nodes will behave in the same way as described for Node 2. The candidate nodes are selected based on the current UE position as described in more detail below.

S1.3: MRS measurements are carried out and reported back to the serving node.

S1.4: The serving node decides based on analysis of the MRS measurement results which node from the candidate nodes should receive the handover.

S1.5: Handover is executed to the successful candidate node—Node 2.

A new condition is reached with UE being served from a new node, Node 2, with a suitable user plane connection.

FIG. 3 is a messaging diagram showing the generic NR handover procedure of FIG. 2 in more detail with the different roles of the participating entities made clear, namely the serving, source node (Node 1), an example target node (Node 2) and the UE.

Initially Node 1 is the serving node and user data is being transmitted between the UE and Node 1.

Step 1: Node 1 Identifies a need for handover. First, Node 1 needs to select candidate nodes, of which Node 2 is an example here. Secondly, Node 1 needs to specify the mobility reference signals (MRSs) which are to be transmitted by Node 2 (and any other candidate nodes) and measured by the UE subject to the possible handover.

Step 1a: Node 1 requests, with a mobility reference signal (MRS) request, Node 2 to start transmitting one or more RSs with specified beam directions, these MRSs being to allow MRS measurements to be made by the user equipment to support a handover procedure.

Step 1b: Node 2 starts transmitting the MRSs.

Step 1c: Node 1 sends the UE some measurement control information to specify the MRS measurements that the UE should make.

Step 1d: UE measures the specified MRSs.

Step 2: The UE reports back to the Node 1 with a measurement report.

Step 3: Node 1 makes a handover decision based on the received measurement report.

Step 4: Assuming that the decision is to handover to Node 2, Node 1 transmits a handover request to Node 2.

Step 5: Node 2 performs an admission control to decide whether to accept the handover.

Step 6: If Node 2 decided to accept the handover, Node 2 sends a handover request acknowledgement (Ack) to Node 1.

The handover is then performed, whereafter Node 2 becomes the serving node.

Substantially the same procedure can also be used for inter-carrier handover. Instead of the neighboring node (Node 2 in FIG. 1) being in the same carrier, it can be in a different carrier and the UE is assumed to be also capable of supporting the carrier on which Node 2 is functioning. The procedure of transmitting MRSs and of MRS-measurement-based HO can be the same as In FIGS. 2 and 3.

Substantially the same procedure could also be used for beam management involving transfer from one beam to another beam in the same node, or in a different node in the same cell. The labelling of FIGS. 2 and 3 would then be modified by changing the labels Node 1 and Node 2 to Beam 1 and Beam 2.

It will thus be understood that, as part of a handover process between nodes, beams or carriers In an NR system, the network needs to activate reference signals on each carrier, and the UE needs to measure on these carriers and report on those reference signals before the network can make a decision on a suitable handover target. These steps represent a burden for both the network and the UE.

Another approach to handover within 5G architecture is disclosed in:

"Multi-Connectivity in 5G mmWave Cellular Networks"
Giordani, Mezzavilla, Rangan & Zorzi
15th Annual Mediterranean Ad Hoc Networking Workshop (MED-HOC-NET),
2016
30 Apr. 2016
arXiv:1605.00105v1

The handover proposal of Giordani et al Is based on a conventional microwave, master cell (PCell) in LTE containing several higher frequency, millimeter band microcells (SCells) within its footprint which have complex handover requirements based on the directionality of their beam lobes and high attenuation. A UE operating in a microcell transmits reference signals to sweep the angular space, which are picked up by the microcells who make instantaneous signal quality measurements at the different node-UE beam direction combinations, specifically SINR measurements, and report them back to the controlling master cell in the form of a report table. Based on the report table, the master cell then selects the best microcell from among the candidates and executes handover of the UE to that microcell.

SUMMARY

Methods, devices, computer programs and a system are disclosed for handover between nodes In a multi-carrier system environment.

In a first aspect, the disclosure provides a method for User Equipment, UE, handover in a system capable of communicating on multiple carriers, the method comprising:

identifying a need for a serving network entity to make a UE handover;

making a pre-selection among one or more neighboring network entities about which to consider further as candidate network entitles for handover, and on which carriers, wherein the pre-selection is based on a prediction of connection feasibility between the at least one UE and each neighboring network entity;

instructing reference signal measurements to be made between the at least one UE and each candidate network entity limited to the carrier or carriers decided on for each candidate network entity in the pre-selection;

selecting a network entity, and at least one associated carrier, for handover from among the pre-selected candidate network entities based on results from the reference signal measurements; and instructing execution of the handover.

In a second aspect, the disclosure provides a computer program stored on a computer readable medium and loadable into the internal memory of a user equipment, comprising software code portions, when said program is run on a network entity, for performing the method of the first aspect. There may also be provided a computer program product storing the computer program of the second aspect.

In a third aspect, the disclosure provides a controller for a network entity capable of communicating on multiple carriers, the controller comprising a processor operable to manage User Equipment, UE, handover by:

identifying a need for the network entity to make a UE handover;

making a pre-selection among one or more neighboring network entitles about which to consider further as candidate network entities for handover, and on which carriers, wherein the pre-selection is based on a prediction of connection feasibility between the at least one UE and each neighboring network entity;

instructing reference signal measurements to be made between the at least one UE and each candidate network entity limited to the carrier or carriers decided on for each candidate network entity In the pre-selection;

selecting a network entity, and at least one associated carrier, for handover from among the pre-selected candidate network entities based on results from the reference signal measurements; and instructing execution of the handover.

In a fourth aspect, the disclosure provides a controller for a network entity, the controller comprising a processor operable to support User Equipment, UE, handover in relation to at least one UE that the network entity is not currently serving by:

receiving a first request from another network entity, the first request specifying for at least one UE its position and which carrier or carriers the at least one UE is capable of communicating on;

processing the first request to make a prediction of connection feasibility between the network entity and the at least one UE for the specified carriers; and responding to the first request to inform the other network entity of the connection feasibility prediction.

In a fifth aspect, the disclosure provides a method for controlling a network entity to support User Equipment, UE, handover in relation to at least one UE that the network entity is not currently serving, the method comprising:

receiving a first request from another network entity, the first request specifying for at least one UE its position and which carrier or carriers the at least one UE is capable of communicating on;

processing the first request to make a prediction of connection feasibility between the network entity and the at least one UE for the specified carriers; and responding to the first request to inform the other network entity of the connection feasibility prediction.

In the fifth aspect, the method may further comprise: responding to a second request from another network entity to participate in reference signal measurements by instructing the network entity to transmit a reference signal on a carrier specified In the second request. Moreover, in response to the second request, the method of the fifth aspect may further comprise: instructing the network entity to transmit the reference signal In a beam direction specified in the second request.

In a sixth aspect, the disclosure provides a computer program stored on a computer readable medium and loadable into the internal memory of a user equipment, comprising software code portions, when said program is run on a controller, for performing the method of the fifth aspect. There is also provided a computer program product storing the computer program of the sixth aspect.

In a seventh aspect, the disclosure provides a system capable of supporting communicating on multiple carriers, the system comprising:

a first network entity; and a second network entity neighboring the first network entity, wherein the first network entity has a first processor operable to manage User Equipment, UE, handover of at least one UE that the first network entity is currently serving, by:

identifying a need for the first network entity to make a UE handover;

making a pre-selection among one or more neighboring network entities, which comprise the second network entity, about which to consider further as candidate network entities for handover, and on which carriers, wherein the pre-selection is based on a prediction of connection feasibility between the at least one UE and each neighboring network entity;

instructing reference signal measurements to be made between the at least one UE and each candidate network entity limited to the carrier or carriers decided on for each candidate network entity in the pre-selection;

selecting a network entity, and at least one associated carrier, for handover from among the pre-selected candidate network entities based on results from the reference signal measurements; and instructing execution of the handover, and wherein the second network entity has a second processor operable to support UE handover In relation to at least one UE that the second network entity is not currently serving, by:

receiving a first request from the first network entity, the first request specifying for at least one UE its position and which carrier or carriers the at least one UE is capable of communicating on;

processing the first request to make a prediction of connection feasibility between the second network entity and the at least one UE for the carriers specified as useable by the at least one UE;

responding to the first request to inform the first network entity of the connection feasibility prediction.

With these aspects of the disclosure, embodiments are envisaged as follows. The serving node informs the neighboring nodes about the UE radio position and/or geo position and the UE's capabilities. The UE's capabilities may include for example which carriers the UE supports, how many frequencies the UE can handle simultaneously, the UE's signal receiving specification, e.g. UE noise power. That is, UE capabilities may relate to hardware or software capabilities. To take a concrete example, if one of the UE capabilities specifies that the signal processing hardware is quite noisy, then it could be inferred that this UE will have poorer coverage than otherwise. The neighboring nodes reply with some representation of predicted signal efficacy, such as their predicted signal quality and strength for each specified carrier. Quality may include a statistical or time-dependent aspect such as signal variance. The serving node can then determine based on these predicted values how to carry out a MRS measurement campaign with the UE selectively, with the MRS measurement campaign limited to feasible and promising candidate nodes and carriers. The turning on of reference signals can thus be limited, e.g. to a particular carrier and excluding nodes that either cannot accept a handover from the UE on technical or policy grounds, or which have poor predicted signal quality or strength.

In embodiments of the disclosure, the method performed by a first network node (i.e. the source node) for handing over the UE to the neighboring network node (i.e., the target node) in a wireless communication network, comprises:

Collecting a first information about the UE indicating the capabilities of the UE and the position of the UE which may be a geo position, a radio position or a prediction of position Sending the first information about the UE to one or more neighboring network nodes Receiving the neighbor carrier coverage prediction information (e.g. In the form of a table) for the said UE from one or more neighboring network nodes Instructing reference signal measurements to be made between the said UE and candidate target network entities selected from among the neighboring network nodes based on the neighbor carrier coverage prediction information Selecting based on an analysis of the results of the reference signal measurements which network node or nodes among the candidates should be the target network node(s) for handover, and which carrier or carriers should be handed over to.

Executing the handover procedure for the said UE with the target network node(s) in the selected target carrier(s)

In embodiments of the disclosure, the method performed by a neighboring network node for the handover of the UE from the first network node in a wireless communication network, comprises:

Receiving first information about the UE from the first network node

Identifying the contents of the carrier coverage prediction information (e.g. In the form of a table) based on the received first information about the UE Sending the carrier coverage prediction information for the said UE to the said first network node Executing (optionally) the handover procedure for the said UE with the said first network node The advantages achievable by certain embodiments of the disclosure include:

Aggregating neighbor carrier prediction tables enables an efficient mobility reference signal activation Network transmits reference signals only in the carrier(s) that is(are) predicted to be suitable UE measures on only the suitable carrier(s) at a multiple carrier HO border Certain embodiments allow use of "always on" signals from the network to be avoided so it is expected to be able to significantly lower network energy consumption. There is also less resource overhead needed for carrying out the MRS measurement campaign because of the approach taken whereby a selection of which reference signals to use is made. Moreover, other advantages should be: better scalability, higher degree of forward compatibility during the RAT evolution phase, lower interference from system overhead signals and consequently higher throughput in low load scenario, and improved support for user-centric beam-forming.

The connection feasibility prediction between the UE and each candidate network entity can be based on the position of the UE and on which carriers are useable by each pairing of UE and candidate network entity. Which carriers are useable by each pairing of UE and candidate network entity can be based on which carriers are supported by each pairing and optionally also UE permissions to communicate on the useable carriers. That is to say, predicted carrier coverage is one specific way in which a prediction of connection feasibility can be made according to embodiments of the disclosure.

Making the pre-selection may comprise the serving network entity sending requests one or more neighboring network entities to specify carriers they would recommend for their communication with the UE. In certain embodiment, making the pre-selection comprises: the serving network entity collecting UE capability information on which carriers are useable by the UE; the serving network entity sending the UE capability information and the UE position to each of the one or more neighboring network entities; and receiving from each neighboring network entity the connection feasibility prediction.

The connection feasibility prediction may involve an estimate of connection quality, which may be in the form of a probability that the connection quality exceeds a threshold value deemed acceptable for a reliable connection.

Making the pre-selection may comprise specification of a beam direction between the UE and each neighboring network entity, wherein the instructed reference signal measurements specify which beam directions to use, and wherein the selection of the network entity for handover comprises: specification of a beam direction.

The present disclosure is applicable to a variety of handover scenarios with different combinations of source and target, and inter- as well as intra-carrier handover. For example, the handover may be to a different network entity, i.e. from one network entity to another. However, the handover could be to the same network entity and involve a change of carrier or carriers.

Which network entities are responsible for different steps in the handover procedure can be varied. For example, the method of the first aspect may be carried out entirely In the serving network entity, or may be partly or wholly devolved to another network entity or computing resource. For example, the method of the first aspect could be carried out in a network entity other than the serving network entity, in which case the method would further comprise communicating the network entity, and associated at least one carrier, selected for handover to at least one of the serving network entity and the network entity that has been selected for handover. When there are multiple UEs which have a need for handover at the same time, then the pre-selection can jointly assess how best to specify the MRS measurement campaign. For example, if the above-recited at least one UE comprises a first UE and a second UE, the pre-selection of candidate network entities can be based on combining a first connection feasibility prediction for the first UE and a second connection feasibility prediction for the second UE. A particular network entity can then be chosen (or not chosen) to transmit a MRS as part of the MRS measurement campaign based on a combined probability obtained from the first and second UEs in respect of coverage by that network entity. This joint approach may be adopted for all possible network entitles or only a subset of the possible network entitles.

In a further aspect, the disclosure provides control means for a network entity capable of communicating on multiple carriers, the control means operable to manage User Equipment, UE, handover, the control means comprising:
  means operable to identify a need for a serving network entity to make a UE handover;
  means operable to make a pre-selection among one or more neighboring network entitles about which to consider further as candidate network entities for handover, and on which carriers, wherein the pre-selection is based on a prediction of connection feasibility between the UE and each neighboring network entity;
  means operable to instruct reference signal measurements to be made between the UE and each candidate network entity limited to the carrier or carriers decided on for each candidate network entity In the pre-selection;
  means operable to select a network entity, and at least one associated carrier, for handover from among the pre-selected candidate network entities based on results from the reference signal measurements; and
  means operable to instruct execution of the handover.

In a still further aspect, the disclosure provides a control means for a network entity, operable to support User Equipment, UE, handover in relation to at least one UE that the network entity is not currently serving, the control means comprising:
  means operable to receive a first request from another network entity, the first request specifying for at least one UE its position and which carrier or carriers the at least one UE is capable of communicating on;
  means operable to process the first request to make a prediction of connection feasibility between the network entity and the at least one UE for the specified carriers; and
  means operable to respond to the first request to inform the other network entity of the connection feasibility prediction.

In yet another aspect, there is provided handover management means capable of being incorporated in a network node, the handover management means comprising:
  UE handover decision means operable to identify a need for a serving network entity to make a UE handover;
  node pre-selection means operable to make a pre-selection among one or more neighboring network entitles about which to consider further as candidate network entities for handover, and on which carriers, wherein the pre-selection is based on a prediction of connection feasibility between at least one UE and each neighboring network entity;
  MRS measurement instruction means operable to instruct reference signal measurements to be made between the at least one UE and each candidate network entity limited to the carrier or carriers decided on for each candidate network entity In the pre-selection;
  node selection means operable to selecting a network entity, and at least one associated carrier, for handover from among the pre-selected candidate network entities based on results from the reference signal measurements; and
  handover execution means operable to instruct execution of the handover.

In a further aspect, there is provided carrier coverage prediction means capable of being incorporated in a network node, the carrier coverage prediction means comprising:
  UE capabilities receiving means operable to receive a request from another network entity, the request specifying for at least one UE its position and which carrier or carriers the at least one UE is capable of communicating on;
  processing means operable to process the request to make a prediction of connection feasibility between the network entity and the at least one UE for the specified carriers; and
  response means operable to responding to the request to inform the other network entity of the connection feasibility prediction.

BRIEF DESCRIPTION OF THE DRAWINGS

The embodiments of the disclosure presented herein are described herein below with reference to the accompanying example drawings.

FIG. 5 is an example messaging diagram showing the NR handover procedure of FIG. 4 in more detail.

FIG. 6 is an example of a signaling format for user equipment capability and position information.

FIG. 7 is an example for a reporting format for coverage prediction information.

DETAILED DESCRIPTION

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to 5G (5th generation) and also 4G (4th generation) networks, it will be appreciated that the technique presented herein is not limited to any type of cellular network access.

Those skilled in the art will further appreciate that the services, functions and steps explained herein may be implemented using software functioning In conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described In the context of methods and systems, the technique presented herein may also be embodied In a computer program product as well as in a system comprising a computer processor and a memory coupled to the processor, wherein the memory is encoded with one or more programs that execute the services, functions and steps disclosed herein.

Memory may comprise any known computer-readable storage medium, which is described below. In one implementation, cache memory elements of memory provide temporary storage of at least some program code (e.g., program code) in order to reduce the number of times code needs to be retrieved from bulk storage while instructions of the program code are carried out. Moreover, similar to CPU, memory may reside at a single physical location, comprising one or more types of data storage, or be distributed across a plurality of physical systems in various forms.

The description uses a number of acronyms, the meaning of which is as follows:

| Abbreviation | Explanation |
| --- | --- |
| AAS | Active Antenna System |
| AN | Access Node |
| CCPM | Carrier Coverage Prediction Mapping |
| CP | Control Plane |
| CRS | Cell-specific Reference Signal |
| DL | Downlink |
| HO | Handover |
| IFFT | Inverse Fast Fourier Transform |
| LTE | Long Term Evolution |
| MIMO | Multiple Input Multiple Output |
| MRS | Mobility Reference Signal |
| MU-MIMO | Multi-User MIMO |
| NR | New Radio |
| OFDM | Orthogonal Frequency Division Multiplexing |
| RSRP | Reference Signal Received Power |
| RSRQ | Reference Signal Received Quality |
| SINR | Signal to Interference plus Noise Ratio |
| SNR | Signal to Noise Ratio |
| SON | Self-Organizing Network |
| TXRU | Transmitter and Receiver Unit |
| UE | User Equipment |
| UP | User Plane |
| WCDMA | Wideband Code Division Multiple Access |

Figure 1:
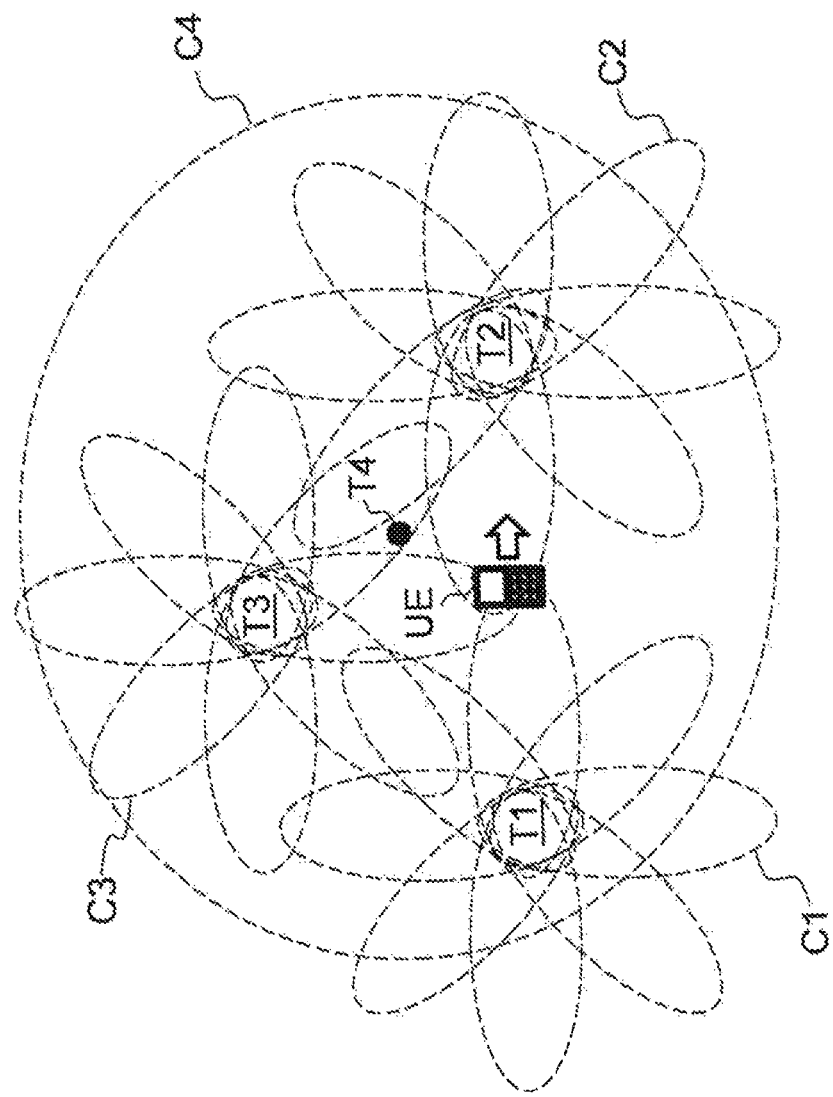
FIG. 1 is a schematic diagram of an example system environment having several transmitter network entitles with partially overlapping coverage and an example moving UE (user equipment).
Figure 2:
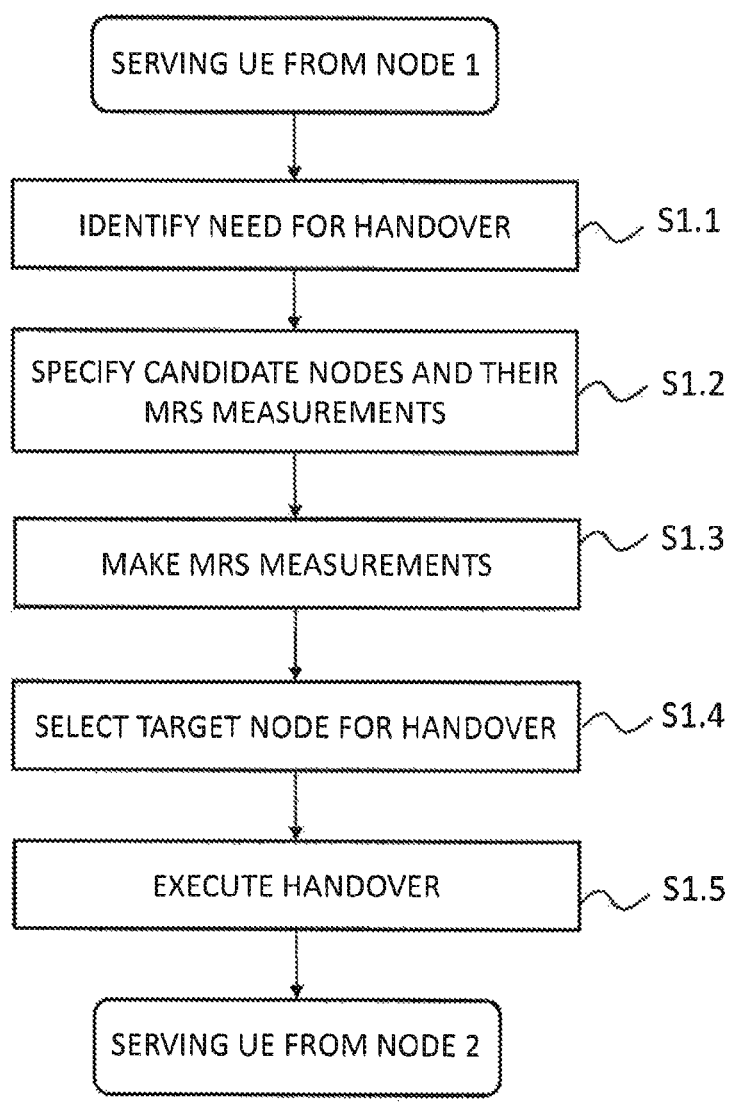
FIG. 2 shows steps of an example generic handover procedure in an NR system.
Figure 3:
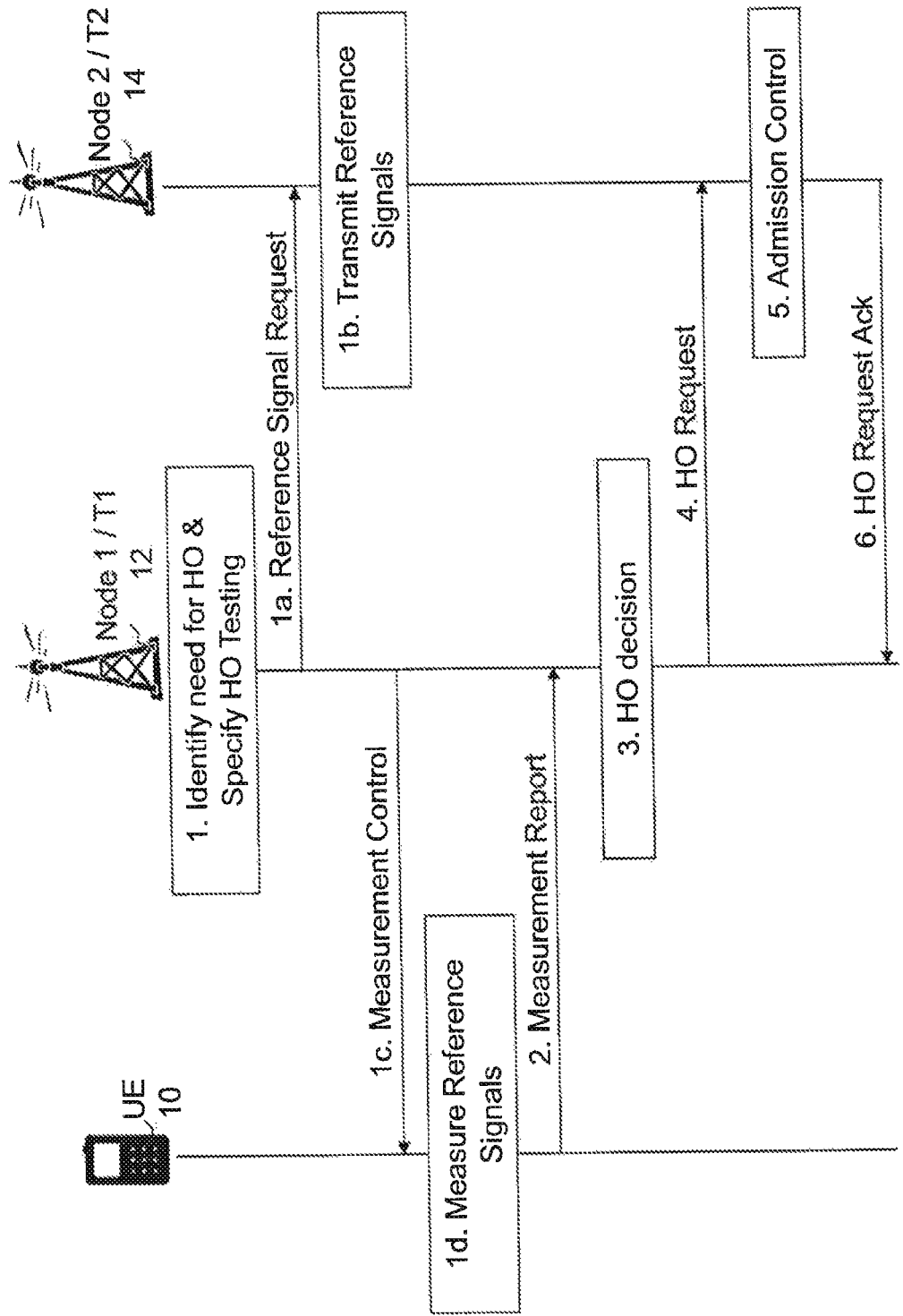
FIG. 3 is an example messaging diagram of the generic NR handover procedure of FIG. 2.
Figure 4:
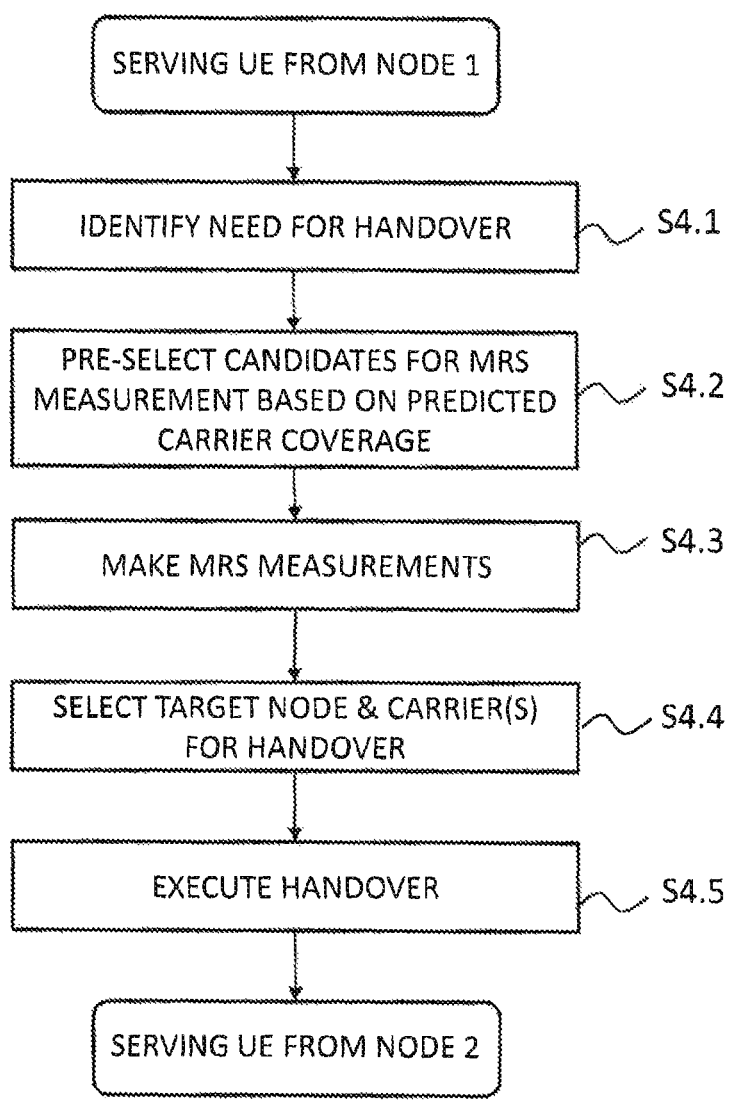
FIG. 4 shows steps of an example handover procedure in an NR system according to an embodiment of the disclosure.

FIG. 4 shows steps of a UE handover procedure in an NR system according to an embodiment of the disclosure. It is noted that the UE handover may take place In the same general NR system environment as illustrated in FIG. 1. That is a system environment having several transmitter network entitles, referred to as nodes in the following, with partially overlapping coverage. A single UE is shown located In the system environment, although it will be appreciated that the number is arbitrary and may amount to several hundred or more.

Initially, Node 1 is serving a UE. The handover procedure then proceeds as follows:

S4.1: A measurement result indicates a need for handover for the UE.

S4.2: With reference to predicted carrier coverage, the serving node selects candidate nodes and carriers for carrying out an MRS measurement campaign. The candidate node selection will also typically be based on UE position, at least to the extent that a particular node is capable of communicating with the UE, e.g. the UE and node share at least one common carrier.

S4.3: MRS measurements are carried out and reported back to the serving node.

S4.4: The serving node decides based on analysis of the MRS measurement results which node from the candidate nodes should receive the handover.

S4.5: Handover is executed to the successful candidate node—Node 2.

Finally, a new condition is reached with UE being served from a new node, Node 2.

FIG. 5 is an example messaging diagram showing In more detail on the handover procedure of FIG. 4 in more detail, in particular in respect of Step S4.2, namely the step of pre-selecting candidates for MRS measurement based on predicted carrier coverage. In particular, in FIG. 5 the different roles of the participating entitles in this part of the procedure are made clear, namely the serving, source node (Node 1), a target node (Node 2) and the UE. Arrows between the three columns show the messaging between them during the overall procedure. Here it will be understood that source node is a synonym for the serving node and target node is a synonym for any non-serving nodes who are potential candidates for taking over the serving through a handover procedure. It will be further understood that although only one target node is shown, there could be any number depending on how many have coverage at the UE's current position. Moreover, the term node is used as a specific example of a network entity having the ascribed function.

Initially, Node 1 is serving a UE with a suitable user plane connection.

S1: A measurement result indicates a need for handover for the UE. The trigger may be deterioration in signal quality, or presence of a stronger signal from another node.

S2: The source node initially identifies the properties related to the specific UE under investigation including: the UE's capabilities and position. The UE position information may for example be a radio position or a geo position, or both, or a prediction of position. The UE position may also include a position accuracy indicator. The UE's capabilities may refer to capabilities such as which carriers it can support, how many frequencies it can handle simultaneously, the UE's signal detection specification (e.g. the UE noise power). A carrier may correspond to a specific communications protocol using a particular frequency or frequency band. The radio position may correspond to the position in terms of the radio properties including an accuracy measure of the estimated radio-position, for example signal strengths of different signals from different beams/nodes, or pre-coders chosen, or timing estimates relative different nodes, the timing estimates can correspond to an estimate of the UE-to-node Line of Sight (LoS) time, or the time related to any of the signal paths. These are just a few examples of properties of the radio position and the actual radio-position could also be some statistical representation of the properties rather than current values. The geo position corresponds to the position including an accuracy measure of the estimated geo position, for example as deduced from GPS.

This set of properties is named the 'first information about the UE' and may be represented as:

First Information of UEx={UE ID,Geo-position$_x$, Radio-position$_x$,UE-capability$_x$}

Here it can be seen that the UE ID (Identifier) may also be incorporated in the first information.

S3a: The source node makes a pre-selection of candidate nodes worthy of further consideration. This determination can be done by look up using the UE position as the argument into a position-to-coverage mapping table, which lists which neighboring network nodes that have, or should have, coverage at the current UE position. A simpler pre-selection would be based solely on proximity to the current UE position and/or serving node position.

S3b: The source node sends the first information about the UE to each neighboring target node(s). The target node receives the first information about the UE sent from the source node.

S4: The target node may then determine a prediction of connection feasibility, for example in the form of a carrier coverage prediction mapping (CCPM), for the UE specified in the first information. The CCPM can be In the form of a table. The CCPM may be based on: the first information; Information on the carriers supported by the target node and, for any supported carriers, their coverage probability; and admissional allowance information specifying whether or not the UE is allowed to be served by the target node.

An example CCPM in table form is as follows:

TABLE

Carrier Coverage Prediction Mapping Table for UEx from a neighboring node

| UEx carrier(s) supported | Target node supported (carrier coverage probability) | Admission allowance |
|---|---|---|
| Carrier 2 | 0.98 | No |
| Carrier 5 | 0.92 | Yes |
| Carrier 6 | 0.25 | Yes |
| Carrier 10 | 0 | Yes |
| Carrier 12 | Not supported | Not applicable |

The above example CCPM table specifies five carriers supported by the UE (Carrier 2, Carrier 5, Carrier 6, Carrier 10, Carrier 12). It can be seen that Carrier 12 is not supported by the target node. For the other carriers, which are supported, the CCPM table specifies the coverage probability for the UE. The probability is a probability that a predicted signal quality metric exceeds a certain threshold, where the threshold corresponds to some acceptable communication quality. The signal quality metric may be a compound metric including multiple factors such as: SINR, SNR, signal strength, time variance in SINR, SNR or signal strength. The coverage probabilities could be determined with the aid of supervised learning (for example neural networks, random forests or some other linear or non-linear method). By using historical handover procedures with its reports and outcomes, one can create prediction models In order to determine coverage probabilities. The CCPM table may also comprise the admission allowance information specifying whether the UE is allowed to access a particular carrier of the target node, which may be time dependent. In summary of the situation In the above example CCPM table, there is a UE connection possibility to the target node using Carrier 5, 6 or 7, whereby Carrier 7 has no coverage and the Carrier 6 poor coverage, so the best option in this case is Carrier 5.

S5: The target node may then transmit the CCPM table giving predicted connection feasibility information on the candidate nodes and their carriers to the source node. The source node receives the CCPM table from the target node.

S6: The source node may then determine suitable target carrier(s) and node(s) for the handover. It is noted that handover may involve a simple handover from one node using one carrier to another node using the same carrier (or a different carrier). However, other handovers may have more components and involve parallel serving by multiple carriers and/or nodes and/or individual beams. For example, the handover could be of the same two carriers from one node to another, or from one node to another with one carrier remaining unchanged and other carriers changing.

S7a: The would-be relinquishing, source node may transmit configuration data to the UE in relation to the target node candidate(s) comprising carrier(s) specification, so that the UE can carry out MRS measurements as desired by the source node.

S7b: The would-be relinquishing, source node may transmit MRS command(s) (i.e. request(s)) to target node candidate(s) selected for MRS testing, wherein the command informs the recipient target node candidate(s) on which carrier(s) and which beam(s) should be activated (i.e. enable) for MRS measurement. The command may optionally specify further detail of the beam characteristics, such as beam directions and beam shapes.

S8a: The target node candidate(s), in response to receiving the MRS transmission request from the source node, may turn on the relevant beams in the relevant carriers. Here it is noted that, from the perspective of the target node candidate(s), this step may only exist for a target node that has been selected by the source node for MRS measurement. Other target nodes that were active participants up to Step S5, but were then determined by the source node not to be sufficiently promising candidates In Step S6, will not receive an MRS command from the source node.

S8b: The UE may measures the MRSs transmitted by the target node candidates for the specified carriers.

Here it is noted that the above description of the MRS testing assumes DL testing. In other embodiments UL testing from UE to target node could be performed instead of or as well as the DL testing. It will be appreciated that for UL testing the UE will transmit the MRSs and the target node candidate(s) will measure them.

S8c: The UE may deliver the DL testing results to the source node.

S8d: The candidate target node(s) may deliver the UL measurement results to the source node.

S9: The serving node may decide, based on analysis of the MRS measurement results, which node from the candidate nodes should receive the handover.

S10: Handover is initiated to the successful candidate node—Node 2.

S11a/S11b: The UE and Node 2 perform handover.

A new condition is reached with UE being served from a new node, Node 2, with a suitable user plane connection.

Comparing the different methods of candidate selection for MRS measurement between the present embodiment and the generic handover procedure described in the introduction, it will be appreciated that selecting candidates based on carrier coverage prediction has the effect that the MRS measurements that are carried out are much more limited in terms of which nodes, carriers and beams are selected for the MRS measurement campaign. This tends to make the procedure quicker and more energy efficient that the simpler candidate selection of the generic handover procedure.

FIG. 6 shows an example signaling format of the first information (denoted UE information) from source node to target node. The geo position is reported in this example in similar fashion to how the UE reports its position In E-UTRAN. The radio position can be specified as a sequence of radio information, where each element in the sequence corresponds to measurement from a node specified by the node ID. The measurements can comprise the precoder of the UE in that node, or as aforementioned, the time estimate, signal strength etc.

FIG. 7 shows an example reporting format for coverage prediction information, the reporting being from target node to source node. This coverage prediction reporting format may comprise the carrier-Info sequence which is a sequence of the possible carriers. In one embodiment, the sequence only signals carriers that are allowed, that is, the 'carrierAllowed' element is removed. In another embodiment, the sequence may comprise only carriers with 'carrierProbability' values greater than 0.

It is noted that in the example formats shown In FIG. 6 and FIG. 7 some of the parameters, which relate to intrinsically continuous variables, such as the carrier probability and signal strength, are specified as integers, so would need to be quantized In order to be represented as integer values. One could for example use a table that maps floating point values to an integer value. Alternatively, the format could be changed to use floating point values.

The following variations to this process flow are envisaged.

In a scenario wherein there are multiple neighboring, target nodes covering the UEx, the source node will obtain a prediction of carrier feasibility from each, such as the above-described CCPM. Based on the required level of robustness and the required throughput requirement, the source node could choose from the set of CCPMs the carrier that is best suited for the UE handover. In doing so, the source node also identifies which of the neighboring nodes should start transmitting MRSs in the chosen carrier(s) to support a smooth handover procedure. (In other embodiments, one could have blind handovers, depending on a node's coverage probability).

In another embodiment, the source node can identify and initiate transmission of MRSs on more than one carrier, in order to increase the UE handover robustness. For example, if the highest carrier coverage probability among neighboring nodes using the current carrier is below a certain threshold, or a combined coverage probability for all neighboring nodes using the current carrier is below a certain threshold, then MRS could be activated on one or more other carriers to find an appropriate target node for handover from the source node.

In one embodiment, the CCPM is further divided into MRS beams for each carrier, with their corresponding coverage probability. This allows for the serving node to trade-off between accuracy (MRS coverage) and the number of MRS beams required during the handover procedure. If the CCPM from the candidate, target nodes indicates a high coverage probability, it can decide to reduce the number of MRSs to be activated, while still maintaining a sufficient coverage probability. Note that the combined coverage probability for each carrier would still be of interest.

In another embodiment, the CCPM may provide indications of the expected quality of each MRS.

In another embodiment, the CCPM may further provide the redundancy between MRSs, which allows for the serving, source node to reduce the number of beams that need to be considered, without this reduction causing a significant reduction in the coverage probability.

In another embodiment, the decision of which MRS to activate could be based on a combined UE coverage probability. If two or more UEs simultaneously have a handover requirement from the same source node, one could combine the per-UE carrier coverage probabilities in the decision on which MRSs to activate.

It is noted that the above examples are described in a distributed architecture, as in LTE. The present disclosure can however also be embodied in more centralized architectures, such as semi-centralized architectures or C-RAN. For example, in the case of C-RAN, the different nodes in the above cases would rather be interpreted as different remote radio heads (RRH). These would be connected to a centralized position where the processing is performed. In that case, the information sharing would be done internally within the same processing duster. In this case, the C-RAN would rather have access to all information tables of the different RRH, making it possible to make faster decisions without inter-base station interfaces. What is important is to have tables representing the coverage information between different RRH. In a semi-centralized architecture, there could be base stations with distributed transmission points (TP), spread out geographically. In an intra-base station case, that is between TP's belonging to the same base station, the procedure could be performed similarly to the C-RAN case, except that the processing would be performed in the base station. Even with distributed TP's, there is a need for interbase-station interfaces in the case of overlapping beams from TP's belonging to different base stations.

Figure 8:
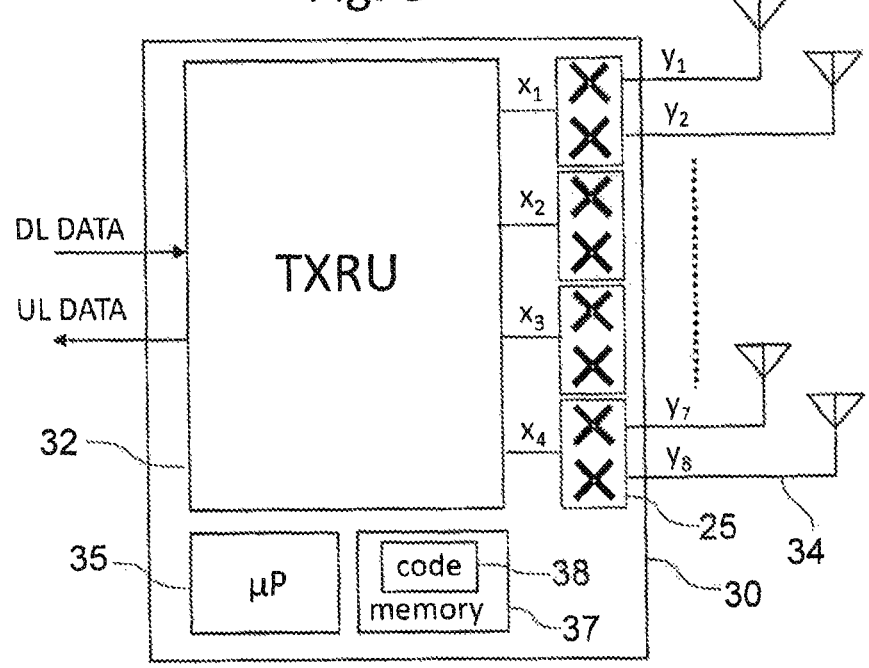
FIG. 8 is an example block schematic diagram of a network node.

FIG. 8 is an example block schematic diagram of a node 30 embodying the present disclosure, for example for participating in the method of FIG. 4 and FIG. 5, which may be the source node or the target node. The node 30 is configured to handle both DL and UL data transmission. DL data is processed in a TXRU (Transmitter and Receiver Unit) 32 for MU-MIMO with serial-to-parallel conversion, precoding and IFFT (Inverse Fast Fourier Transform). By way of example, each of four subarrays 25 has one pair of antennas 34. The label x denotes the 4 signals mapped to the antenna sub-elements and y the 8 signals mapped to the 8 antenna subarrays. For massive MIMO it will be appreciated the number of antenna elements will be much larger, e.g. 100+, but this small number is illustrated for ease of representation. The node 30 includes a processor 35 capable of executing computer code for implementing embodiments of the disclosure, either in the role of serving node or target node or both. The computer code may be stored in memory 37 of the node as a computer program 38. It will be appreciated that TXRU 32 will have general processing capabilities that can also be programmed to implement a handover procedure embodying the disclosure, both in respect of a role as a source node and a role as a target node, so that separate processor and memory as illustrated may not be required.

Figure 9:
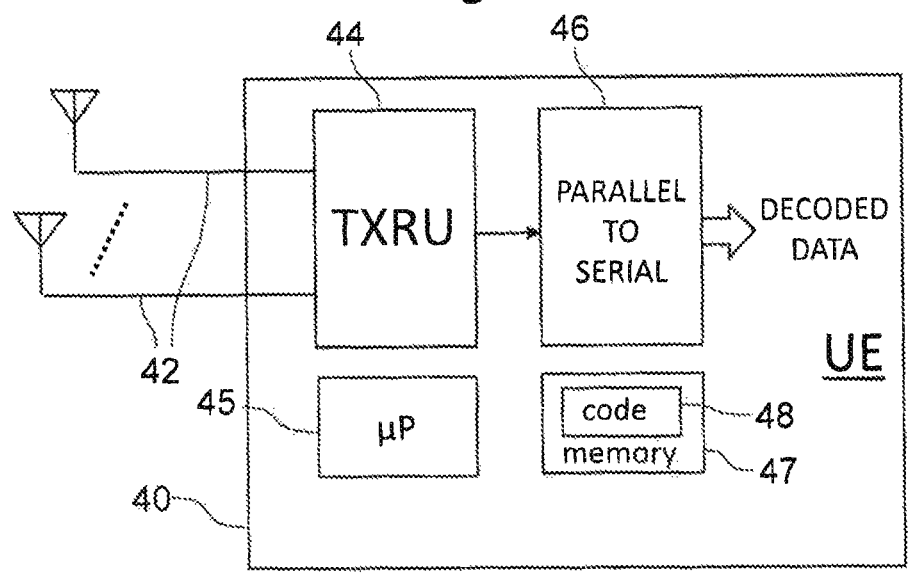
FIG. 9 is an example block schematic diagram of a UE for use with the network node of FIG. 8.

FIG. 9 is an example block schematic diagram of a UE 40 for use with the node 30 of FIG. 8. It will be understood that typically the node will be communicating with multiple UEs, which may each have the design shown. The UE is assumed to be the most downstream of the communicating network entitles. The UE has multiple antennas 42 arranged to receive the MU-MIMO signal bearing the, for example OFDM (Orthogonal Frequency Division Multiplexing), encoded data from the node 30 and decodes it with the receiver part of a TXRU 44 and subsequent parallel-to-serial converter 46, whereupon the decoded data may be used by the UE. In some embodiments, the UE could have a MIMO array similar to the transmitter. In other embodiments, the UE may have only a single antenna element. The UE 40 includes a processor 45 capable of executing computer code for implementing embodiments of the disclosure. The computer code may be stored in memory 47 of the node as a computer program 48.

Figure 10:
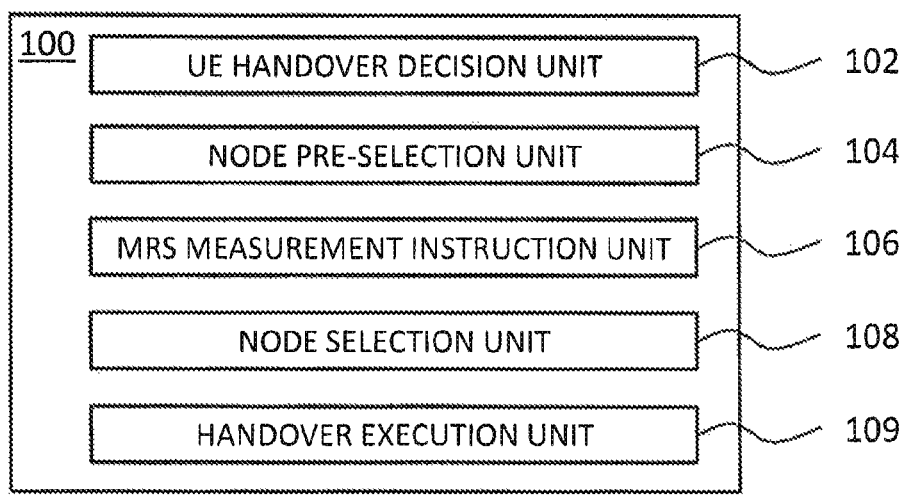
FIG. 10 is an example block schematic diagram showing a handover management unit incorporated in the network node of FIG. 8.

FIG. 10 is an example block schematic diagram showing a handover management unit 100 incorporated In the network node of FIG. 8, for example node 12 of FIG. 5. A UE handover decision unit 102 is operable to identify a need for a serving network entity to make a UE handover. A node pre-selection unit 104 is operable to make a pre-selection among one or more neighboring network entitles about which to consider further as candidate network entities for handover, and on which carriers, wherein the pre-selection is based on a prediction of connection feasibility between the UE and each neighboring network entity. An MRS measurement instruction unit 106 is operable to instruct reference signal measurements to be made between the UE and each candidate network entity limited to the carrier or carriers decided on for each candidate network entity in the pre-selection. A node selection unit 108 is operable to selecting a network entity, and at least one associated carrier, for handover from among the pre-selected candidate network entities based on results from the reference signal measurements. A handover execution unit 109 is operable to instruct execution of the handover.

Figure 11:
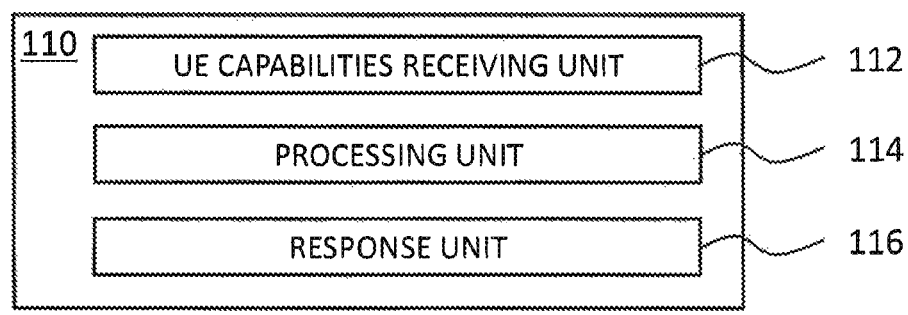
FIG. 11 is an example block schematic diagram showing a carrier coverage prediction unit incorporated in the network node of FIG. 8.

FIG. 11 is an example block schematic diagram showing a carrier coverage prediction unit 110 incorporated In the network node of FIG. 8, for example node 14 of FIG. 5. A UE capabilities receiving unit 112 is operable to receive a request from another network entity, the request specifying for a UE its position and which carrier or carriers the UE is capable of communicating on. A processing unit 114 (for example a CCPM processing unit) is operable to process the request to make a prediction of connection feasibility between the network entity and the UE for the specified carriers, which it may place in a CCPM table. A response unit 116 (for example a CCPM response unit) is operable to responding to the request to inform the other network entity of the connection feasibility prediction by sending for example the CCPM table.

Figure 12:
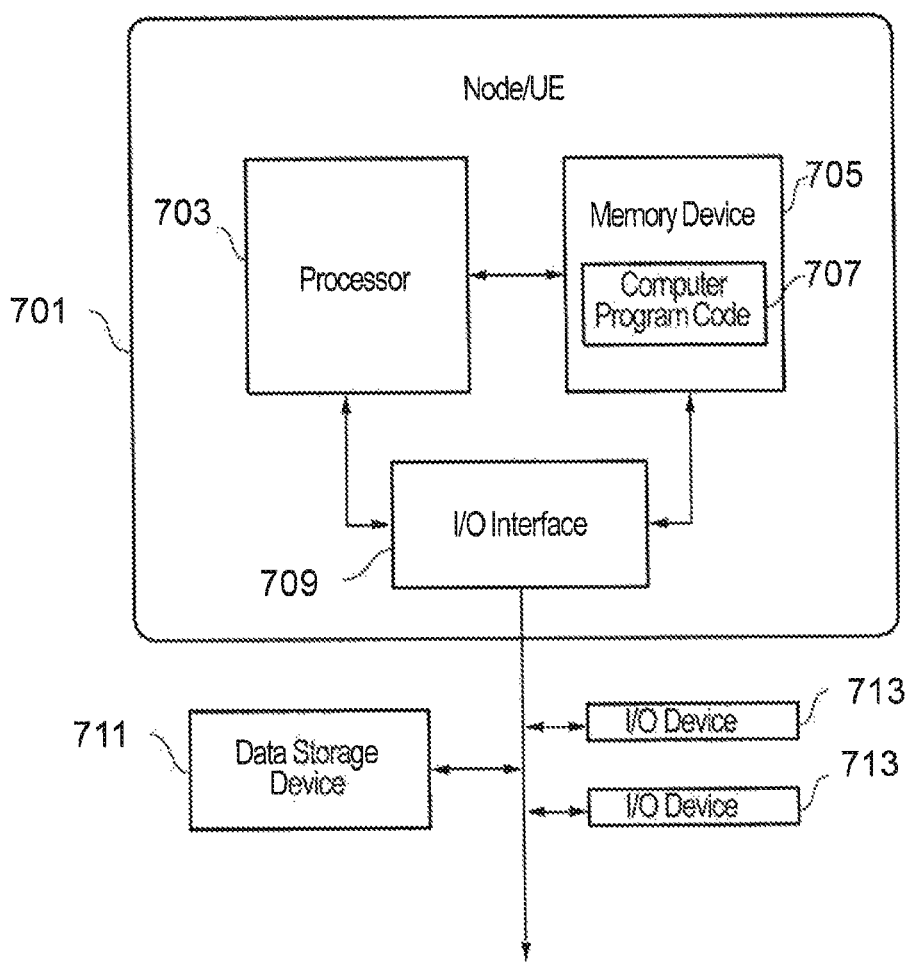
FIG. 12 shows a computing device loaded with computer program code that may be used to implement a method according to any of the embodiments described in the present disclosure on either a network node or a UE.

FIG. 12 shows structural features for providing a processing capability to a node or UE, so that the node or UE can store and execute computer program code that may be used to implement any of the above-described methods and may be incorporated in any of the above-described components.

In FIG. 12, node or UE 701 comprises a processor 703 coupled through one or more I/O interfaces 709 to one or more hardware data storage devices 711 and one or more I/O devices 713 and 715. Processor 703 may also be connected to one or more memory devices or memories 705. At least one memory device 705 contains stored computer program code 707, which is a computer program that comprises computer-executable instructions. The stored computer program code includes a program that implements the method and method aspects presented herein. The data storage devices 711 may store the computer program code 707. Computer program code 707 stored in the storage devices 711 is configured to be executed by processor 703 via the memory devices 705. Processor 703 executes the stored computer program code 707.

Memory 705 may comprise any known computer-readable storage medium, which is described below. In one implementation, cache memory elements of memory 705 provide temporary storage of at least some program code (e.g., program code 707) in order to reduce the number of times code needs to be retrieved from bulk storage while instructions of the program code are carried out. Moreover, similar to CPU 703, memory 705 may reside at a single physical location, comprising one or more types of data storage, or be distributed across a plurality of physical systems In various forms.

I/O interface 709 comprises any system for exchanging incoming or outgoing information with an external source. I/O devices 713, 715 comprise any known type of external device, including a display device (e.g., touchscreen), physical or virtual keyboard, etc. A bus provides a communication link between each of the components in node or UE 701, and may comprise any type of transmission link, including electrical, optical, wireless, etc.

I/O interface 709 also allows the node or UE 701 to store information (e.g., data or program instructions such as program code 707) on and retrieve the information from computer data storage unit 711 or another computer data storage unit (not shown). Computer data storage unit 711 may comprise any known computer-readable storage medium. For example, computer data storage unit 711 may be a non-volatile data storage device, such as a semiconductor memory, a magnetic disk so drive (i.e., hard disk drive) or an optical disc drive (e.g., a CD-ROM drive which receives a CD-ROM disk).

An Implementation of the present disclosure may take the form of a computer program product embodied in one or more computer-readable storage medium(s) (e.g., memory 705 and/or computer data storage unit 711) having computer-readable program code (e.g., program code 707) embodied or stored thereon.

Program code (e.g., program code 707) embodied on a computer-readable medium may be transmitted using any appropriate medium, including but not limited to wireless, wireline, optical fiber cable, radio frequency (RF), etc., or any suitable combination of the foregoing.

It Is believed that the advantages of the technique presented herein will be fully understood from the foregoing description, and it will be apparent that various changes may be made In the form, constructions and arrangement of the exemplary aspects thereof without departing from the scope of the disclosure or without sacrificing all of its advantageous effects. Because the technique presented herein can be varied In many ways, it will be recognized that the disclosure should be limited only by the scope of the claims that follow.

Alternative Embodiment

Technical Field of Alternative Embodiment

The alternative embodiment relates to interference cancellation in multi-carrier networks.

Background of Alternative Embodiment

A known problem In mobile telecommunications is that a UE with connections to a network entity can suffer interference from another network entity with which it is not communicating.

For example, if a UE is close to a cell boundary, then the signal from the connected network entity is likely to be weak and hence be close to the noise floor, so that the signal from the neighbor cell(s) may be strong enough to represent significant interference. Another example is when a UE is connected to a femto- or pico-cell, and the macro-cell causes interference.

Inter-Cell Interference Coordination (ICIC) is used to reduce such interference, i.e. for noise reduction, using a combination of frequency domain or time domain separation, e.g. one transmitting node is configured to use different frequencies and/or timeslots compared with the neighbor transmitting node. ICIC was introduced in 3GPP Release 8.

Summary of Alternative Embodiment

Methods, devices, computer programs and a system are disclosed for Interference reduction for a UE-serving node connection in a multi-carrier system environment, said interference being caused by other nodes.

The above-described procedure of the previous embodiments can be adapted in this alternative embodiment, so that it can also be applied to ICIC Interference reduction measures.

For interference reduction, reference signals to be measured by the UE can be transmitted either on-demand (i.e. demanded by the UE) or when the network deems it Is appropriate to transmit such reference signals. However, the UE itself cannot easily Identify noise/interference sources. For example, there may be no interference In the control plane where the reference signals propagate, but significant Interference in the user plane where data Is being transferred to the UE. One reason for occurrence of interference on data channels but no interference on control channels is when a neighbor node is transmitting data towards its UEs, but Is not transmitting reference signals that could be blindly decoded by the UE that Is suffering the Interference. Consequently, network nodes need to have primary responsibility for identifying which network entitles are acting as interferers to a given UE In the network.

Taking the example of a UE with multi-carrier capability, the UE could be maintaining multiple simultaneous connections ('legs') to its serving network node on different carriers, i.e. have a multi-connectivity capability. In such a scenario, generally each carrier will have a different noise background, but the UE will have difficulty in assessing any interference and where it is originating.

The serving network entity, on receiving a report showing poor connection quality for the UE, can request all its neighbor network entities to transmit an Interference estimation related reference signal (e.g., CSI-IM=Channel State Information-Interference Measurement) for all their supported carriers and simultaneously ask the UE to measure on these reference signals. This would represent a large overhead on the network from the transmission point of view and on the UE from the measuring and reporting point of view.

It is therefore proposed to use a filtering process, similar to the above-described handover scenario, so that the Interference estimation is restricted to feasible and optionally also likely candidates.

Accordingly, the serving network node performs a pre-selection of which neighbors to participate in the interference estimation and cancellation procedures.

This has the advantage that the network will limit the number of reference signal transmissions needed from the neighboring nodes. Moreover, the UE will have fewer reference signal measurements to carry out and report on.

The trigger for Interference measurement could be the UE delivering a channel quality report to its serving node, which shows the serving node that there is a noise/Interference problem. Alternatively, the Interference measurement process could be triggered by the serving node or some other network entity tasked with reviewing, e.g. periodically, network channel conditions.

In a first aspect of the alternative embodiment, there is provided the actions specified in the following numbered clauses.

1. A method for interference cancellation in respect of a connection between a serving node (12) and a User Equipment (10), UE, in a system capable of communicating on multiple carriers, the method comprising:
   identifying a need for a serving network entity (12) to perform interference measurements (S13.1);
   making a pre-selection among one or more neighboring network entities (14) about which to consider further as candidate network entitles for interference measurements, and on which carriers, wherein the pre-selection is based on a prediction of interference probability between at least one UE and each neighboring so network entity (S13.2);
   instructing reference signal measurements to be made between the at least one UE and each candidate network entity limited to the carrier or carriers decided on for each candidate network entity in the pre-selection (S13.3);
   selecting at least one neighboring network entity, and at least one associated carrier, for undertaking interference cancellation from among the pre-selected candidate network entities based on results from the reference signal measurements (S13.4); and
   instructing interference cancellation to be performed (S13.5).

2. The method of clause 1, wherein making the pre-selection comprises:
   the serving network entity collecting UE capability information on which carriers are useable by the at least one UE;
   the serving network entity sending the UE capability information and the UE position to each of the one or more neighboring network entities; and
   receiving from each neighboring network entity the interference probability prediction.

3. The method of clause 1 or 2, wherein the interference probability prediction is a probability that the connection quality exceeds a threshold value deemed acceptable for a reliable connection.

4. The method of any of the clauses 1 to 3, wherein the interference probability prediction between the at least one UE and each candidate network entity is based on at least one of the position of the at least one UE and on which carriers are useable by each pairing of UE and candidate network entity.

5. The method of clause 4, wherein which carriers are useable by each pairing of UE and candidate network entity is based on which carriers are supported by each pairing.

6. The method of any preceding clause, wherein making the pre-selection comprises:

the serving network entity sending requests to one or more neighboring network entities to specify carriers they would recommend for their communication with the at least one UE should they wish to connect.

7. A computer program stored on a computer readable medium and loadable into the internal memory of a user equipment, comprising software code portions, when said program is run on a network entity, for performing the method of any one of clauses 1 to 6.

8. A computer program product storing the computer program of clause 7.

9. A controller (35) for a network entity (12, 30) capable of communicating on multiple carriers, the controller comprising a processor (32, 35, 903) operable to manage interference cancellation In a connection between a serving network entity and a User Equipment (10) by:
 Identifying a need for the serving network entity to consider interference cancellation being performed by other network entities (S13.1) to reduce interference in the connection between the serving network entity and at least one UE;
 making a pre-selection among one or more neighboring network entities about which to consider further as candidate network entities for performing interference cancellation, and on which carriers, wherein the pre-selection is based on a prediction of interference probability between the at least one UE and each neighboring network entity (S13.2);
 instructing reference signal measurements to be made between the UE and each candidate network entity limited to the carrier or carriers decided on for each candidate network entity in the pre-selection (S13.3);
 selecting a network entity, and at least one associated carrier, for interference cancellation from among the pre-selected candidate network entities based on results from the reference signal measurements (S13.4); and
 instructing performance of the interference cancellation (S13.5).

It is noted that the controller of clause 9 may also be adapted to carry out the method of any of clauses 2 to 6.

10. A network entity (30) comprising the controller of any one of clauses 9.

11. A controller (35) for a network entity (14), the controller comprising a processor (32, 35, 903) operable to support interference cancellation to reduce interference between another, serving network entity and at least one User Equipment, UE, that the network entity is not currently serving by:
 receiving a first request from another network entity (12), the first request specifying for at least one UE its position and which carrier or carriers the at least one UE is capable of communicating on;
 processing the first request to make a prediction of interference probability between the network entity and the at least one UE for the specified carriers; and
 responding to the first request to inform the other network entity of the interference probability prediction.

12. The controller of clause 11, wherein the interference probability prediction involves an estimate of connection quality.

13. The controller of clause 12, wherein the interference probability prediction is a probability that the connection quality exceeds a threshold value deemed acceptable for a reliable connection.

14. The controller of clause 11, 12 or 13, wherein the processor is further operable by:
 responding to a second request from another network entity to participate in reference signal measurements by instructing the network entity to transmit a reference signal on a carrier specified in the second request.

15. The controller of clause 14, wherein, in response to the second request, the controller is additionally operable to Instruct the network entity to transmit the reference signal in a beam direction specified in the second request.

16. A network entity capable of communicating on multiple carriers comprising the controller of any one of clauses 11 to 15.

17. A method for controlling a network entity (14) to support interference cancellation to reduce interference between another, serving network entity and at least one User Equipment, UE, (10) that the network entity is not currently serving, the method comprising:
 receiving a first request from another network entity (12), the first request specifying for a UE its position and which carrier or carriers the at least one UE is capable of communicating on;
 processing the first request to make a prediction of interference probability between the network entity and the at least one UE for the specified carriers; and
 responding to the first request to inform the other network entity of the interference probability prediction.

18. The method of clause 17, wherein the interference probability prediction involves an estimate of connection quality.

19. The method of clause 18, wherein the interference probability prediction is a probability that the connection quality exceeds a threshold value deemed acceptable for a reliable connection.

20. The method of clause 17, 18 or 19, further comprising:
 responding to a second request from another network entity to participate in reference signal measurements by instructing the network entity to transmit a reference signal on a carrier specified In the second request.

21. The method of clause 20, wherein, in response to the second request, the method further comprises:
 instructing the network entity to transmit the reference signal In a beam direction specified In the second request.

22. A computer program stored on a computer readable medium and loadable into the internal memory of a user equipment, comprising software code portions, when said program is run on a controller, for performing the method of any one of clauses 17 to 21.

23. A computer program product storing the computer program of clause 22.

24. A system capable of supporting communicating on multiple carriers, the system comprising:
 a first network entity (12); and
 a second network entity (14) neighboring the first network entity,
 wherein the first network entity has a first processor operable to manage connection quality between the first network entity and at least one User Equipment, UE, that the first network entity is currently serving, by:
 identifying a need for the first network entity to perform interference measurements;
 making a pre-selection among one or more neighboring network entities, which comprise the second network entity, about which to consider further as candidate network entites for performing interference cancellation, and on which carriers, wherein the pre-selection is based on a prediction of interference probability between the at least one UE and each neighboring network entity;

instructing reference signal measurements to be made between the at least one UE and each candidate network entity limited to the carrier or carriers decided on for each candidate network entity in the pre-selection;

selecting at least one network entity, and at least one associated carrier, for interference cancellation from among the pre-selected candidate network entities based on results from the reference signal measurements; and instructing execution of the interference cancellation, and wherein the second network entity has a second processor operable to support UE handover in relation to at least one UE that the second network entity is not currently serving, by:

receiving a first request from the first network entity, the first request specifying for at least one UE its position and which carrier or carriers the at least one UE is capable of communicating on;

processing the first request to make a prediction of interference probability between the second network entity and the at least one UE for the carriers specified as useable by the at least one UE;

to responding to the first request to inform the first network entity of the interference probability prediction.

Detailed Description of Alternative Embodiment

Figure 13:
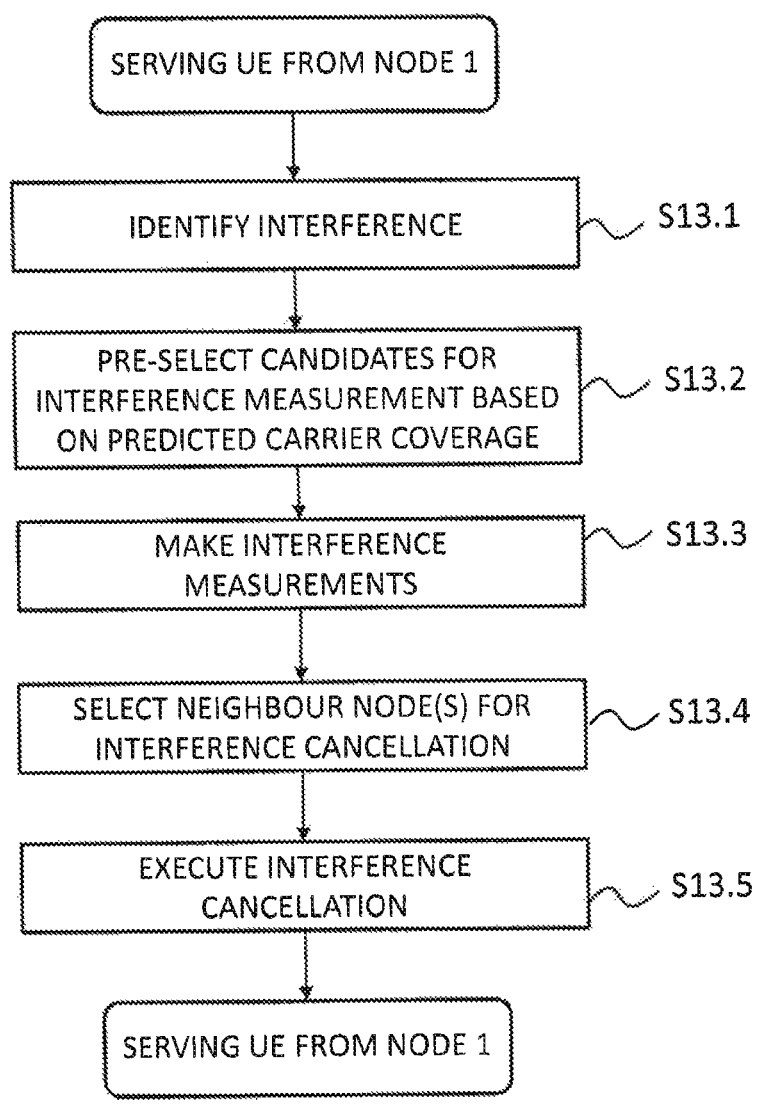
FIG. 13 shows steps of an interference reduction procedure according to an alternative embodiment of the disclosure.

FIG. 13 shows steps of an interference reduction procedure according to an embodiment of the disclosure. It is noted that the interference reduction procedure may take place In the same general system environment as illustrated In FIG. 1. That is a system environment having several transmitter network entities, referred to as nodes in the following, with partially overlapping coverage. A single UE is shown located in the system environment, although it will be appreciated that the number is arbitrary and may amount to several hundred or more.

Node 1 is serving a UE. The interference estimation and cancellation procedure then proceeds as follows:

S13.1: A measurement result indicates presence of interference of the signal between the serving node and the UE, as perceived by the UE.

S13.2: With reference to predicted carrier coverage, the serving node selects candidate nodes and carriers for carrying out an interference measurement campaign. The candidate node selection will also typically be based on UE position, at least to the extent that a particular node is capable of communicating with the UE, e.g. the UE and node share at least one common carrier.

S13.3: Interference measurements are carried out and reported back to the serving node.

S13.4: The serving node decides based on analysis of the interference measurement results which node from the candidate nodes should undertake noise cancellation measures and in respect of which carrier(s).

S13.5: Noise cancellation is undertaken by the instructed neighbor nodes—Node 2.

Finally, the serving node—Node 1—continues to serve the UE, but in a more benign noise environment.

Figure 14:
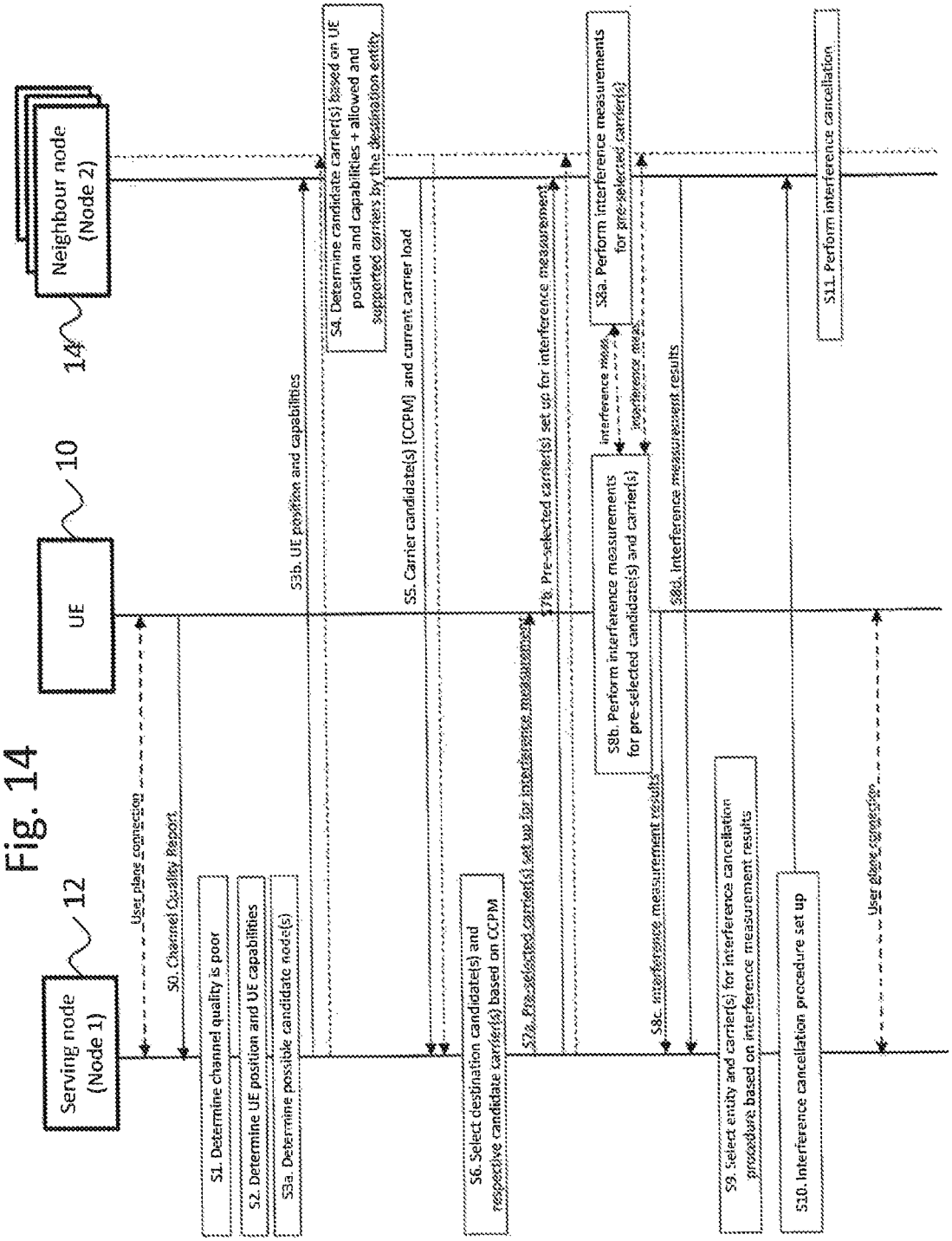
FIG. 14 is an example messaging diagram showing in more detail on an interference estimation and cancellation procedure according to the alternative embodiment.

FIG. 14 is an example messaging diagram showing in more detail on an interference estimation and cancellation procedure according to the present embodiment, showing the procedure of FIG. 13 in more detail, in particular in respect of Step S13.2, namely the step of pre-selecting candidates for interference measurement based on predicted carrier coverage. In particular, in FIG. 14 the different roles of the participating entities in this part of the procedure are made clear, namely the serving node (Node 1), a neighbor node (Node 2) and the UE. Arrows between the three columns show the messaging between them during the overall procedure. It will be further understood that although only one neighbor node is shown, there could be any number depending on how many have coverage at the UE's current position. Moreover, the term node is used as a specific example of a network entity having the ascribed function.

Initially, Node 1 is serving a UE with a suitable user plane connection.

S0: A channel quality report is sent from the UE 10 to the serving node 12.

S1: The serving node assesses the channel quality report and decides the interference is bad enough, i.e. the channel quality is poor enough, to require some mitigating action.

S2: The serving node initially identifies the properties related to the specific UE under investigation including: the UE's capabilities and position. The UE position information may for example be a radio position or a geo position, or both, or a prediction of position. The UE position may also include a position accuracy indicator. The UE's capabilities may refer to capabilities such as which carriers it can support, how many frequencies it can handle simultaneously, the UE's signal detection specification (e.g. the UE noise power). A carrier may correspond to a specific communications protocol using a particular frequency or frequency band. The radio position may correspond to the position in terms of the radio properties including an accuracy measure of the estimated radio-position, for example signal strengths of different signals from different beams/nodes, or pre-coders chosen, or timing estimates relative different nodes, the timing estimates can correspond to an estimate of the UE-to-node Line of Sight (LoS) time, or the time related to any of the signal paths. These are just a few examples of properties of the radio position and the actual radio-position could also be some statistical representation of the properties rather than current values. The geo position corresponds to the position including an accuracy measure of the estimated geo position, for example as deduced from GPS.

This set of properties is named the 'first information about the UE' and may be represented as:

First Information of UEx={UE ID,Geo-position$_x$, Radio-position$_x$,UE-capability$_x$}

Here it can be seen that the UE ID (Identifier) may also be incorporated in the first information.

S3a: The serving node makes a pre-selection of candidate nodes worthy of further consideration. This determination can be done by look up using the UE position as the argument into a position-to-coverage mapping table, which lists which neighboring network nodes that have, or should have, coverage at the current UE position. A simpler pre-selection would be based solely on proximity to the current UE position and/or serving node position.

S3b: The serving node sends the first information about the UE to each neighboring neighbor node(s). The neighbor node receives the first information about the UE sent from the serving node.

S4: The neighbor node may then determine a prediction of the likelihood, i.e. probability, that each given neighbor node might be causing interference, for example in the form of a carrier coverage prediction mapping (CCPM), for the UE specified in the first information. The CCPM can be In the form of a table. The CCPM may be based on: the first information; information on the carriers supported by the neighbor node and, for any supported carriers, their coverage probability.

An example CCPM in table form is as follows:

TABLE

Carrier Coverage Prediction Mapping Table for UEx from a neighboring node

| UEx carrier(s) supported | Neighbor node supported (carrier coverage probability) |
|---|---|
| Carrier 2 | 0.98 |
| Carrier 5 | 0.92 |
| Carrier 6 | 0.25 |
| Carrier 10 | 0 |

The above example CCPM table specifies four carriers supported by the UE (Carrier 2, Carrier 5, Carrier 6, Carrier 10). The CCPM table specifies the coverage probability for the UE. The probability is a probability that a predicted signal quality metric exceeds a certain threshold, where the threshold corresponds to some acceptable communication quality. The signal quality metric may be a compound metric including multiple factors such as: SINR, SNR, signal strength, time variance in SINR, SNR or signal strength. The coverage probabilities could be determined with the aid of supervised learning (for example neural networks, random forests or some other linear or non-linear method). In summary of the situation in the above example CCPM table, there is a UE connection possibility to the neighbor node using Carrier 5, 6 or 7, whereby Carrier 7 has no coverage and the Carrier 6 poor coverage, so the best option in this case is Carrier 5. In the context of interference, the carrier coverage probability is taken as a proxy (i.e. substitute) for probability of that neighbor node interfering, since it may be transmitting on the same frequency (i.e. with the same carrier) as the serving node, and the probability of interference also scales with predicted signal strength at the UE.

S5: The neighbor node may then transmit the CCPM table giving predicted connection feasibility information on the candidate nodes and their carriers to the serving node which is taken as a proxy (i.e. substitute) for probability of that neighbor node interfering as mentioned further above. The serving node receives the CCPM table from the neighbor node.

S6: The serving node may then determine suitable target carrier(s) and node(s) for interference cancellation.

S7a: The serving node may transmit configuration data to the UE in relation to the neighbor node candidate(s) comprising carrier(s) specification, so that the UE can carry out interference measurements as desired by the serving node.

S7b: The serving node may transmit interference command(s) (i.e. request(s)) to neighbor node candidate(s) selected for interference testing, wherein the command informs the recipient neighbor node candidate(s) on which carrier(s) and which beam(s) should be activated (i.e. enable) for interference measurement. The command may optionally specify further detail of the beam characteristics, such as beam directions and beam shapes.

S8a: The neighbor node candidate(s), in response to receiving the interference transmission request from the serving node, may turn on the relevant beams in the relevant carriers. Here it is noted that, from the perspective of the neighbor node candidate(s), this step may only exist for a neighbor node that has been selected by the serving node for interference measurement. Other neighbor nodes that were active participants up to Step S5, but were then determined by the serving node not to be sufficiently promising candidates In Step S6, will not receive an interference command from the serving node.

S8b: The UE may measures the interferences transmitted by the neighbor node candidates for the specified carriers.

Here it is noted that the above description of the interference testing assumes DL testing. In other embodiments UL testing from UE to neighbor node could be performed instead of or as well as the DL testing. It will be appreciated that for UL testing the UE will transmit the interferences and the neighbor node candidate(s) will measure them.

S8c: The UE may deliver the DL testing results to the serving node.

S8d: The candidate neighbor node(s) may deliver the UL measurement results to the serving node.

S9: The serving node may decide, based on analysis of the interference measurement results, which node from the candidate nodes should receive instructions to undertake interference mitigation actions, i.e. Interference cancellation.

S10: Interference cancellation procedure setup commands are sent from the serving node—Node 1- to those neighbor nodes—Node 2 in FIG. 14—which have been decided upon.

S11: The UE continues to be served by its serving node—Node 1—but hopefully now with less interference.

The final condition is the same as the starting condition, in that Node 1 is still serving the UE, but hopefully in a more benign noise environment.

Figure 15:
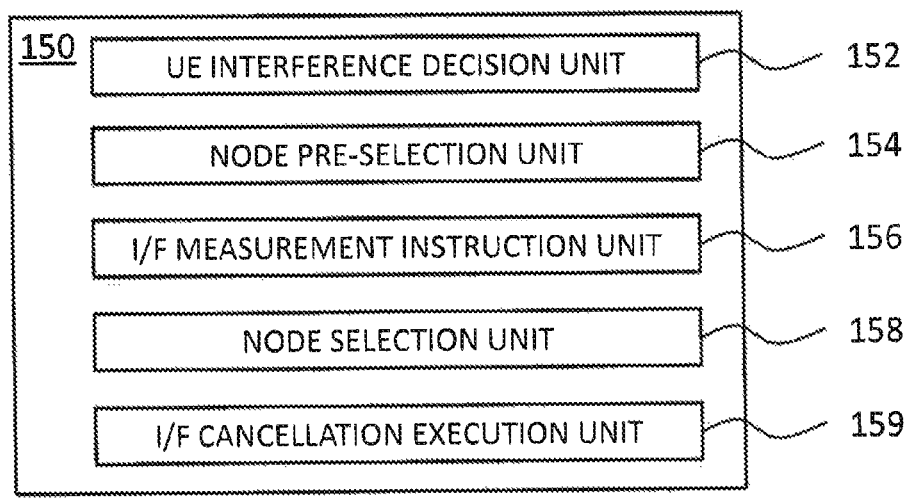
FIG. 15 is an example block schematic diagram showing an interference reduction management unit 150 incorporated In the network node of FIG. 8.

FIG. 15 is an example block schematic diagram showing an interference reduction management unit 150 for the alternative embodiment incorporated in the network node of FIG. 8, for example node 12 of FIG. 13. A UE interference decision unit 152 is operable to identify a need for a serving network entity to consider instructing other network entitles to undertake interference cancellation measures. A node pre-selection unit 154 is operable to make a pre-selection among one or more neighboring network entities about which to consider further as candidate network entities for interference cancellation, and on which carriers, wherein the pre-selection is based on a prediction of interference probability, e.g. through connection feasibility, between the UE and each neighboring network entity. An Interference measurement instruction unit 156 is operable to instruct reference signal measurements to be made between the UE and each candidate network entity limited to the carrier or carriers decided on for each candidate network entity in the pre-selection. A node selection unit 158 is operable to selecting at least one network entity, and at least one associated carrier, for interference cancellation from among the pre-selected candidate network entities based on results from the reference signal measurements. An interference cancellation execution unit 109 is operable to instruct execution of interference cancellation.

Figure 16:
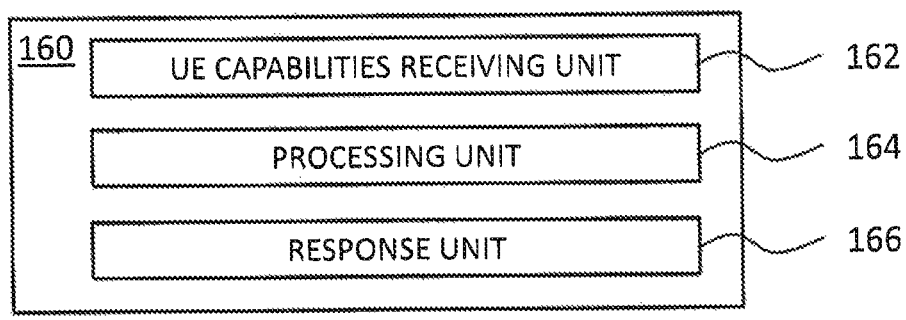
FIG. 16 is an example block schematic diagram showing a carrier coverage prediction unit 160 for the alternative embodiment Incorporated In the network node of FIG. 8.

FIG. 16 is an example block schematic diagram showing a carrier coverage prediction unit 160 for the alternative embodiment incorporated in the network node of FIG. 8, for example node 14 of FIG. 13. A UE capabilities receiving unit 162 is operable to receive a request from another network entity, the request specifying for a UE Its position and which carrier or carriers the UE is capable of communicating on. A processing unit 164 (for example a CCPM processing unit) is operable to process the request to make a prediction of connection feasibility (as a proxy for interference probability) between the network entity and the UE for the specified carriers, which it may place in a CCPM table. A response unit 166 (for example a CCPM response unit) is operable to responding to the request to Inform the other network entity of the connection feasibility prediction by sending for example the CCPM table.

It Is noted that the node as shown in FIG. 8 may be used for the alternative embodiment, for example for participating in the method of FIG. 13 and FIG. 14, and may be the serving node or a neighbor node.

It is further noted that the UE as shown In FIG. 9 may be used for the alternative embodiment In combination with the node(s) of FIG. 8. It will be understood that typically the serving node will be communicating with multiple UEs, which may each have the design shown.

It Is still further noted that in this alternative embodiment structural features for providing a processing capability to a node or UE as described in relation to FIG. 12 may also be used, so that the node or UE can store and execute computer program code that may be used to Implement the above-described alternative method and may be incorporated In any of the above-described components.

It is also noted that the alternative embodiment is compatible with other embodiments, so these embodiments may be combined as desired, e.g. incorporated in a single network entity or user equipment.

The invention claimed is:

1. A method implemented by a network entity for User Equipment (UE) handover in a system capable of communicating on multiple carriers, the method comprising:
    identifying a need for a serving network entity to make a UE handover;
    receiving, from one or more neighboring network entities, a prediction of connection feasibility to at least one UE;
    making a pre-selection among the one or more neighboring network entities about which to consider further as candidate network entities for the handover, and on which carriers, based on the prediction of connection feasibility;
    instructing reference signal measurements to be made between the at least one UE and each candidate network entity limited to the carrier or carriers decided on for each candidate network entity in the pre-selection;
    selecting a network entity, and at least one associated carrier, for handover from among the pre-selected candidate network entities based on results from the reference signal measurements; and
    instructing execution of the handover.

2. The method of claim 1, wherein the connection feasibility prediction between the at least one UE and each candidate network entity is based on at least one of a position of the at least one UE and on which the carriers are useable by each pairing of the UE and candidate network entity.

3. The method of claim 2, wherein which the carriers are useable by each pairing of the UE and the candidate network entity is based on which the carriers are supported by each pairing.

4. The method of claim 1, wherein receiving the connection feasibility prediction comprises sending, by the serving network entity, requests to the one or more neighboring network entities to specify the carriers they would recommend for their communication with the at least one UE.

5. The method of claim 1, wherein receiving the connection feasibility prediction comprises:
    collecting, by the serving network entity, UE capability information on which the carriers are useable by the at least one UE;
    sending, by the serving network entity, the UE capability information and a UE position to each of the one or more neighboring network entities; and
    receiving from each neighboring network entity the connection feasibility prediction.

6. The method of claim 1, wherein the connection feasibility prediction involves an estimate of connection quality.

7. The method of claim 6, wherein the connection feasibility prediction is a probability that the connection quality exceeds a threshold value deemed acceptable for a reliable connection.

8. The method of claim 1,
    wherein the at least one UE comprises a first UE and a second UE,
    and wherein the pre-selection of at least one of the candidate network entities is based on combining a first connection feasibility prediction for the first UE and a second connection feasibility prediction for the second UE.

9. A non-transitory computer readable recording medium storing a computer program product for controlling User Equipment (UE) handover in a system capable of communicating on multiple carriers, the computer program product comprising software instructions which, when run on processing circuitry of a network entity, causes the network entity to perform the method of claim 1.

10. A controller for a network entity capable of communicating on multiple carriers, the controller comprising:
    processing circuitry;
    memory containing instructions executable by the processing circuitry whereby the controller is operative to manage User Equipment (UE) handover by:
        identifying a need for a serving network entity to make a UE handover;
        receiving, from one or more neighboring network entities, a prediction of connection feasibility to at least one UE;
        making a pre-selection among the one or more neighboring network entities about which to consider further as candidate network entities for the handover, and on which carriers, based on the prediction of connection feasibility;
        instructing reference signal measurements to be made between the at least one UE and each candidate network entity limited to the carrier or carriers decided on for each candidate network entity in the pre-selection;
        selecting a network entity, and at least one associated carrier, for the handover from among the pre-selected candidate network entities based on results from the reference signal measurements; and
        instructing execution of the handover.

11. The controller of claim 10, wherein the connection feasibility prediction between the at least one UE and each candidate network entity is based on a position of the at least one UE and on which the carriers are useable by each pairing of the UE and candidate network entity.

12. The controller of claim 11, wherein which the carriers are useable by each pairing of the UE and the candidate network entity is based on which the carriers are supported by each pairing.

13. The controller of claim 10, wherein receiving the prediction of connection feasibility comprises sending, by the serving network entity, requests to the one or more neighboring network entities to specify the carriers they would recommend for their communication with the at least one UE.

14. The controller of claim 10, wherein receiving the prediction of connection feasibility comprises:
- collecting, by the serving network entity, UE capability information on which the carriers are useable by the at least one UE;
- sending, by the serving network entity, the UE capability information and a UE position to each of the one or more neighboring network entities; and
- receiving from each neighboring network entity the connection feasibility prediction.

15. The controller of claim 10, wherein the connection feasibility prediction involves an estimate of connection quality.

16. The controller of claim 15, wherein the connection feasibility prediction is a probability that the connection quality exceeds a threshold value deemed acceptable for a reliable connection.

17. A controller for a network entity, the controller comprising:
- processing circuitry;
- memory containing instructions executable by the processing circuitry whereby the controller is operative to support User Equipment (UE) handover in relation to at least one UE that the network entity is not currently serving by:
  - receiving a first request from another network entity, the first request specifying for the at least one UE its position and which carrier or carriers the at least one UE is capable of communicating on;
  - processing the first request to make a prediction of connection feasibility between the network entity and the at least one UE for the specified carriers; and
  - responding to the first request to inform the other network entity of the connection feasibility prediction.

18. The controller of claim 17, wherein the connection feasibility prediction involves an estimate of connection quality.

19. The controller of claim 18, wherein the connection feasibility prediction is a probability that the connection quality exceeds a threshold value deemed acceptable for a reliable connection.

20. The controller of claim 17, wherein the instructions are such that the processing circuitry is operable to support the UE handover by responding to a second request from the other network entity to participate in reference signal measurements by instructing the network entity to transmit a reference signal on a carrier specified in the second request.

21. A method for controlling a network entity to support User Equipment (UE) handover in relation to at least one UE that the network entity is not currently serving, the method comprising:
- receiving a first request from another network entity, the first request specifying for the at least one UE its position and which carrier or carriers the at least one UE is capable of communicating on;
- processing the first request to make a prediction of connection feasibility between the network entity and the at least one UE for the specified carriers; and
- responding to the first request to inform the other network entity of the connection feasibility prediction.

22. The method of claim 21, wherein the connection feasibility prediction involves an estimate of connection quality.

23. The method of claim 22, wherein the connection feasibility prediction is a probability that the connection quality exceeds a threshold value deemed acceptable for a reliable connection.

24. The method of claim 21, further comprising responding to a second request from the other network entity to participate in reference signal measurements by instructing the network entity to transmit a reference signal on a carrier specified in the second request.

25. A non-transitory computer readable recording medium storing a computer program product for controlling a network entity to support User Equipment (UE) handover in relation to at least one UE that the network entity is not currently serving, the computer program product comprising software instructions which, when run on processing circuitry of the network entity, causes the network entity to perform the method of claim 21.

* * * * *